US010497361B1

(12) United States Patent
Rule et al.

(10) Patent No.: US 10,497,361 B1
(45) Date of Patent: Dec. 3, 2019

(54) SYSTEMS AND METHODS FOR PROVIDING A VIRTUAL ASSISTANT

(71) Applicant: Capital One Services, LLC, McLean, VA (US)

(72) Inventors: Jeffrey Rule, Chevy Chase, MD (US); Kaylyn Gibilterra, New York, NY (US); Abdelkader Benkreira, Arlington, VA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/232,353

(22) Filed: Dec. 26, 2018

(51) Int. Cl.
| | | |
|---|---|---|
| *G10L 13/04* | | (2013.01) |
| *G10L 13/033* | | (2013.01) |
| *G10L 15/22* | | (2006.01) |
| *H04L 29/06* | | (2006.01) |

(52) U.S. Cl.
CPC .......... *G10L 13/043* (2013.01); *G10L 13/033* (2013.01); *G10L 15/22* (2013.01); *H04L 65/60* (2013.01)

(58) Field of Classification Search
CPC ..... G10L 13/043; G10L 13/033; G10L 15/22; H04L 65/60
USPC ........................................................ 704/251
See application file for complete search history.

(56) References Cited

U.S. PATENT DOCUMENTS

| | | | |
|---|---|---|---|
| 8,787,553 B2 | 7/2014 | Fan et al. | |
| 9,635,178 B2 | 4/2017 | Raanani et al. | |
| 2002/0046030 A1 | 4/2002 | Haritsa et al. | |
| 2003/0033606 A1* | 2/2003 | Puente | H04N 7/17336 |
| | | | 725/110 |
| 2006/0093097 A1 | 5/2006 | Chang | |
| 2009/0006525 A1* | 1/2009 | Moore | G06Q 30/02 |
| | | | 709/202 |
| 2014/0074454 A1* | 3/2014 | Brown | G10L 15/08 |
| | | | 704/9 |
| 2014/0317502 A1* | 10/2014 | Brown | G06F 9/453 |
| | | | 715/706 |
| 2014/0337048 A1* | 11/2014 | Brown | G10L 15/08 |
| | | | 705/2 |
| 2017/0244834 A1 | 8/2017 | Flores et al. | |
| 2017/0286272 A1* | 10/2017 | Yang | G06F 11/3668 |
| 2017/0286273 A1* | 10/2017 | Lau | G06F 11/3664 |
| 2017/0364965 A1* | 12/2017 | Kannan | G06Q 30/0256 |

\* cited by examiner

*Primary Examiner* — Bharatkumar S Shah
(74) *Attorney, Agent, or Firm* — Finnegan, Henderson, Farabow, Garrett & Dunner, LLP

(57) ABSTRACT

Systems and methods for selecting a virtual assistant are provided. An example system may include at least one memory device storing instructions and at least one processor configured to execute the instructions to perform operations that may include receiving a request from a user for a response, and identifying characteristics of the user based on the user request. The operations may also include determining a type of the user request and based on the determined type of the user request and the identified user characteristics, configuring a virtual assistant to interact with the user through at least one of synthesized speech or visual signals. The operations may also include providing the virtual assistant to interact with the user.

19 Claims, 13 Drawing Sheets

SYSTEMS AND METHODS FOR PROVIDING A VIRTUAL ASSISTANT

TECHNICAL FIELD

The disclosed embodiments generally relate to interactive voice response systems. More specifically, the disclosed embodiments relate to configuring a virtual assistant for interactive audio and video communications.

BACKGROUND

Intelligent virtual assistants are impacting customer communication experience and changing the way customers transact business. Virtual assistants are enabling customers to interact with computer systems and information data in a natural human-centered approach by selecting options of the computer systems and retrieving information using customer voice inputs. The virtual assistants of today may speak various languages and express a range of human emotions. They are making an important contribution in the consumer and social settings, as people become reliant on them to perform tedious tasks quickly and efficiently. With the improved capabilities and speech recognition of virtual assistants we are beginning to see them proliferate in customer daily life. They can be used for a wide variety of tasks from answering complex customer queries or supporting calls, to providing an intelligent interface to your website's page webchat.

One of the shortcomings of presently available communication systems employing virtual assistants is that the virtual assistants do not typically react to a style of communication and an emotional state of a user communicating with the system. However, there is clear evidence that an outcome of a user conversation with a virtual assistant frequently depends on a relationship between characteristics of the user and attributes of the virtual assistant, such as choice of words, style of speech, rate of speech, and speech cadence.

Accordingly, there is a need for providing a virtual assistant that can communicate more effectively with a user, taking into account personal characteristics of the user. The disclosed system and methods address the problems set forth above as well as other deficiencies in existing systems and methods.

SUMMARY

Disclosed embodiments provide systems and methods for interactive audio and video communications with a user by means of a virtual assistant.

Consistent with a disclosed embodiment, a system for providing a virtual assistant is provided. The system may comprise at least one memory device storing instructions and at least one processor configured to execute the instructions to perform operations that may include receiving a request from a user for a response, and identifying characteristics of the user based on the user request. The operations may further include determining a type of the user request and based on the determined type of the user request and the identified user characteristics, configuring a virtual assistant to interact with the user through at least one of synthesized speech or visual signals. The operations may further include providing the virtual assistant to interact with the user.

Consistent with another disclosed embodiment, system for providing a virtual assistant is provided. The system may comprise at least one memory device storing instructions and at least one processor configured to execute the instructions to perform operations that may include receiving a request from a user for a response, and identifying characteristics of the user based on the user request and pre-compiled values. The operations may further include identifying characteristics of the request, determining a type of the request based on the request characteristics, and configuring a virtual assistant having attributes based on the request type and the user characteristics.

Consistent with another disclosed embodiment, a method for selecting a virtual assistant for a user having a profile is provided. The method may comprise receiving a request from the user for a response and determining a type of the request. The method may further comprise identifying profile features for the user, selecting a first set of attributes for the virtual assistant corresponding to the request type, and selecting a second set of attributes for the virtual assistant corresponding to the identified user profile features. The method may further comprise identifying user characteristics based on the request, and modifying the first and second sets of the virtual assistant attributes based on the identified user characteristics.

Consistent with other disclosed embodiments, memory device storing instructions may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Figure 1:
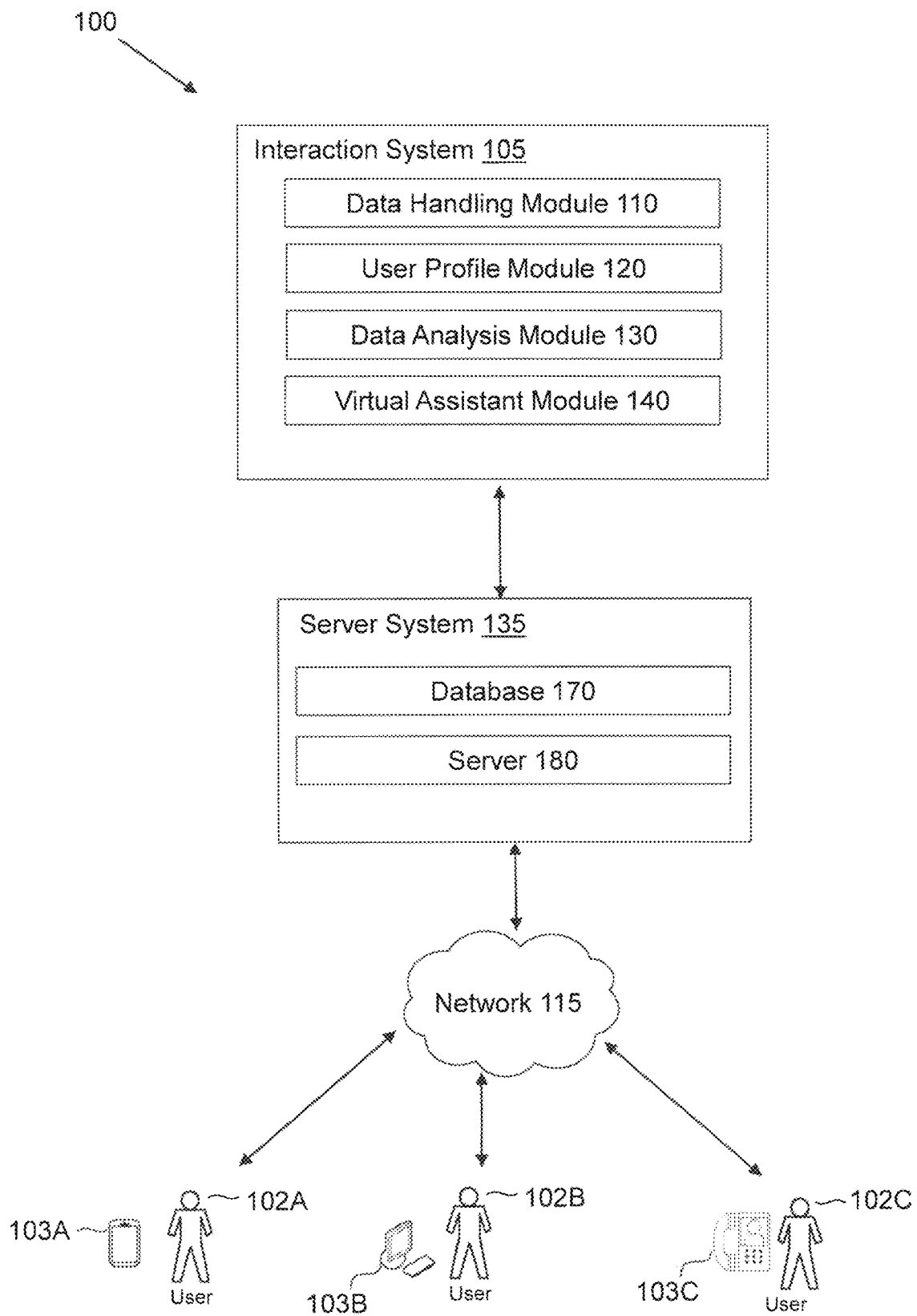
FIG. 1 is a diagram of an illustrative system including an interaction system for configuring a virtual assistant.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific termnns have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments provide systems and methods for facilitating user communication with an entity (e.g., business, government organization, public group, phone answering service, or website). The system may include an interaction system for configuring a virtual assistant (VA) to communicate with the user, and may include a computer-readable storage medium that can retain and store program instructions for execution by a processor.

The computer-readable storage medium may be, for example, but is not limited to, an electronic storage device, a magnetic storage device, an optical storage device, an electromagnetic storage device, or any suitable combination of the foregoing. A non-exhaustive list of more specific examples of the computer-readable storage medium may include a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, or/and the like.

Program instructions stored on a computer-readable storage medium may include assembler instructions, machine dependent instructions, firmware instructions, source code or object code written in any combination of one or more programming languages, including an object oriented programming languages, procedural programming languages or functional programming languages. The programming language may be Fortran, Lisp, C++ or the like. The program instructions may be executed by a processor of the interaction system. In some embodiments, the program instructions may be executed by a processor of the user device, and in some embodiments, both the user device processor and the processor of the interaction system may execute program instructions.

The disclosed embodiments describe a system for providing a virtual assistant (VA) for a user. In various embodiment, the VA may be enabled by a computer program designed to interact with a user, at least in part, by means of a natural human language. In some embodiments, the system may be configured to receive a request from a user for a response. The term "request" refers to any type of communication data transmitted from the user to the system. For example, the request may include an audio or video communication from a user. In some embodiments, the user request (also referred to as user communication) may also include text and graphical elements. In some embodiments, the user may interact with the system via a landline phone, a smartphone, a desktop computer, a tablet, and the like. In various embodiments, the system may be configured to identify characteristics of the user while the user is in communication with the system. The user characteristics may include speech traits such as user accent, choice of words, rate and cadence of user speech, and emotional content of the user speech. In addition, the user characteristics may include the age of the user, the location of the user, the nationality of the user, and other relevant data about the user.

In various embodiments, the system may be configured to determine a type of request from the user during the first part of the communication of the user and the system. For example, the type of request may be related to an emergency situation such as a theft of a credit card, or flat tire. Alternatively, the type of request may be related to a mundane task such as checking the balance of a credit card. Depending on the type of the request the system may select the appropriate way to handle the request. For example, in case of the emergency, the system may quickly direct the user to an appropriate human assistant, and in case of a mundane task, configure an appropriate VA compatible with user characteristics.

In various embodiments, the system may provide a VA configured to interact with a user using audio signals including a synthesized speech using a computer system that is generally known as a speech synthesizer and can be implemented in software or hardware products. In some embodiments, a text-to-speech (TTS) system may be used to convert text language into speech. Synthesized speech may be created by concatenating pieces of recorded speech that are stored in a database. For high-quality output, the TTS may store entire words or sentences.

In various embodiments, the user may interact with the system via a software application installed on a user device. For example, a user with a smartphone may interact with the system via a software application. In some cases, the software application may transmit audio, video, text, and graphics data between the user and the system. In some embodiments, several streams of communications can be established with the system. For example, the user may interact with the system using the audio data, and receive the documents, or graphical data from the system. Additionally, or alternatively, the user may interact with the system using text messages, video messages, pictures or any combination of thereof. In various embodiments, the software application associated with the user device may include a graphical user interface (GUI). GUI may allow the user to control details of communication with the system by choosing the type of communication (e.g., video, text or audio communication) as well as interacting with system by means of buttons, drop down menus, web pages and/or the like.

In some embodiments, the system may provide a VA configured to interact with a user via visual signals. For example, the VA can include a computer-generated avatar. The avatar can be a two-dimensional or a three-dimensional computer object that may interact with a user through a streaming video. For example, the avatar may represent a person. In some embodiments, the avatar may be placed within a virtual computer environment to interact with virtual forms and documents and present them to the user through a GUI of a software application associated with the user device.

In various embodiments, based on the type of the user request and the user characteristics, the system may select the attributes of a virtual assistant. For example, for a type of urgent request such as, for example, the loss or theft of credit card, the system may configure a VA to ask several pointed questions, related to the urgent matter, that are simple and easy to answer for the user before transferring the user to a live representative. In the emergency situation, the VA may be configured to avoid asking a user questions that might require recollection or research. For example, the VA may be configured to avoid asking a user a question associated with his address twenty years ago. In some embodiments, for each emergency situation, VA may be configured to only ask necessary questions. In some embodiments, for a type of request that requires thorough authentication, the VA may ask a user various security questions and obtain a feedback based on how well the user responds to the questions. In some embodiments, for example, the system may be configured to determine the time that is needed for the user to answer authentication questions. In various embodiments, the VA may be configured based on user characteristics such as age, nationality, language, accent and/or the like.

FIG. 1 is a block diagram of an exemplary communication system 100 for providing a virtual assistant, consistent with disclosed embodiments. Communication system 100 may be used to facilitate user communication with an entity (e.g., business, government organization, public group, phone answering service, or website) that uses VAs to communicate with users. Communication system 100 may include an interaction system 105 and a server system 135 interacting with users 102A-102C via a network 115 using devices 103A-103C. User devices 103A-103C may include various devices, such as mobile computing devices (e.g., a smartphone, tablet computing devices, netbooks, etc.), personal computers (e.g., notebook computers, desktop computers, etc.), gaming consoles, or other suitable devices.

In some embodiments, communication system 100 may allow users 102A-102C to communicate with interaction system 105 using multimedia content, such as text, slides, audio, and video data. The audio data may include synchronous and/or asynchronous voice data. For example, synchronous voice data may include multi-directional live audio exchanges, such as voice-over-IP exchanges, or exchanges using other varieties of telephony. In various embodiments, communication system 100 may be configured to allow users 102A-102C to transmit audio, video, graphics and text data using devices 103A-103C to and from server system 135. Communication system 100 may also be configured to allow interaction system 105 and server system 135 to interact with one another and exchange audio, video, graphics text data as well as programming instructions.

Server system 135 may include a database 170 and a server 180. Database 170 may be used for storing data and may include cloud-based databases (e.g., Amazon Web Services S3 buckets) or on-premises databases. Databases may include, for example, Oracle™ databases, Sybase™ databases, or other relational databases or non-relational databases, such as Hadoop™ sequence files. HBase™, or Cassandra™. Database(s) may include computing components (e.g., database management system, database server, etc.) configured to receive and process requests for data stored in memory devices of the database(s) and to provide data from the database(s).

Server system 135 may be configured to receive the request from users 102A-102C via network 115 and server 180. Network 115 may include any combination of electronic communication networks enabling communication between user devices and the components of the interaction system. For example, network 115 may include the Internet and/or any type of wide area network, an intranet, a metropolitan area network, a local area network (LAN), a wireless network, a cellular communications network, a Bluetooth network, a radio network, a device bus, or any other type of electronic communication network know to one of skill in the art.

Interaction system 105 may be configured to collect user information, analyze user information and configure a virtual assistant (VA) for communication with a user. Interaction system 105 may include computing resources such as processors and memory devices for storing instructions. The processors may be configured to execute software instructions to perform various operations related to the configuration of VAs. The computing resources may include software instructions for data handling, profile processing, and data analysis for the optimal configuration of VAs. Computing resources may include one or more computing devices. The computing devices may include one or more memory units for storing data and software instructions. The memory unit may also store software instructions that may perform one or more operations related to data manipulation and analysis when executed by one or more processors.

The disclosed embodiments are not limited to software instructions arranged as separate programs run on isolated computer processors configured to perform dedicated tasks. In some embodiments, software instructions may be configured as many different programs. In some embodiments, one or more computers may include multiple processors operating in parallel. A processor may be a central processing unit (CPU) or a special-purpose computing device, such as graphical processing unit (GPU), a field-programmable gate array (FPGA) or application-specific integrated circuits.

Interaction system 105 may include a data handling module 110 for obtaining data from the user, a user profile module 120 for processing user related data, a data analysis module 130 for analyzing user profile and streaming data, and a virtual assistant module 140 for configuring a VA for communication with a user. Modules of interaction system 105 may exchange data and/or programming instructions with server system 135. In various embodiments, modules of interaction system 105 may exchange data and/or programming instructions with each other. Various embodiments of the interaction system 105 modules are further described below.

Data handling module 110 may handle audio, video, graphics and text data associated with user communication. For example, data handling module 110 may receive data from user devices 103A-103C via server system 135. In some embodiments, for example, the data may be received by server 180 and transmitted to data handling module 110. In some embodiments, the data may be received by server 180 and stored in database 170 before being transmitted to data handling module 110. The received data may be in the form of streaming data e.g., audio data of a call from a user, video data of a video call from a user, text message data from a user and/or the like. In addition, the received data may contain meta-data such as the phone number of a user, the user IP address, a location of the user, age and gender of the user, and the like. Some of the meta-data may be collected during the communication with the user, and some of the meta-data may be collected through analyzing extraneous data related to the user, such as user purchase history, user political affiliation, user financial data, user assets, user hobbies, and/or user social network activity. In some embodiments, the secondary information may also be retrieved from public records or records associated with the user social security number or credit history.

Some of the received meta-data associated with a user may be related to user devices 103A-103C. For example, meta-data of a user communicating using a smartphone may include a phone number and GPS location. In some embodiments, the user may authorize interaction system 105 to interact with the user device to obtain meta-data, such as, for example, the GPS location of the user device. In some embodiments, other information may be communicated to interaction system 105, such as, for example, contact information of the user, credit card information of the user, authentication information of the user, and the like. In some embodiments, when a user is communicating with interaction system 105 using a laptop or a desktop computer, meta-data associated with the user may include an IP address. In some embodiments, the meta-data may include an account number, a user id, a user password, and/or a user email address, as well as GPS location of the device. The examples of meta-data described here are only illustrative and other meta-data may be possible.

Figure 2:
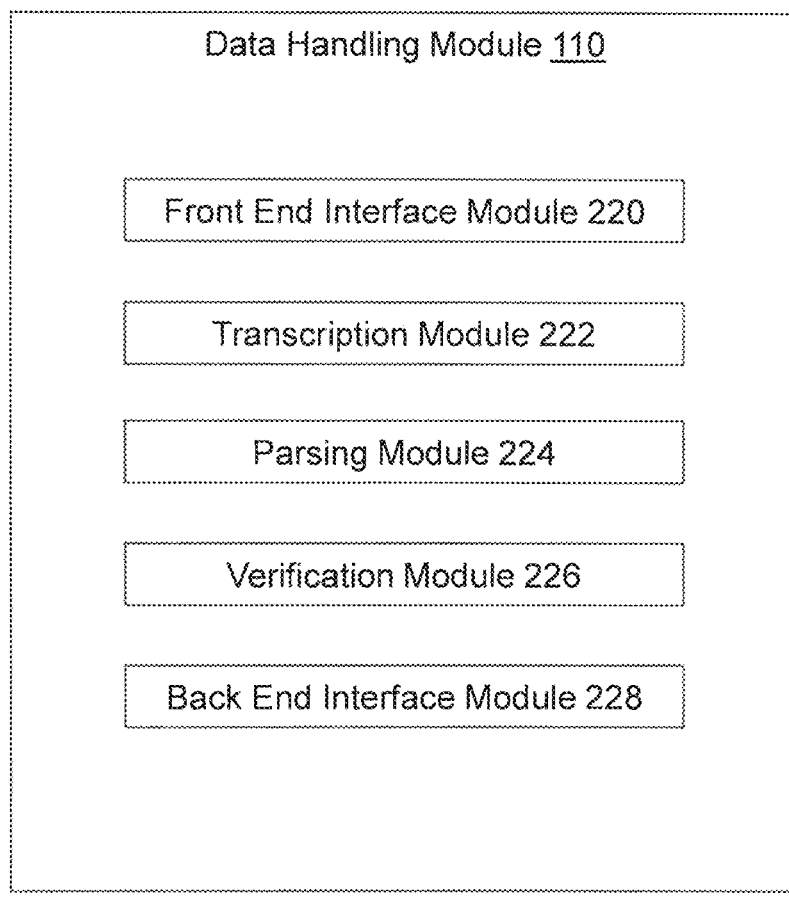
FIG. 2 is a diagram of an illustrative data handling module.

Referring now to FIG. 2, data handling module 110 may include a front end interface module 220 for communicating with a user, a transcription module 222 for transcribing audio data associated with a user request, a parsing module 224 for parsing user related data, a verification module 226 for cross-referencing user information, and a back end interface module 228 for interfacing with the other modules of interaction system 105.

In various embodiments, data handling module 110 may interact with a user via audio, video, graphical or text data using front end interface module 220. Front end interface module 220 may communicate with a user via server system 135. In an example embodiment, front end interface module 220 may interact with a user by asking the user an initial question at the start of the communication. The question may be, for example, an authentication question such as user name, user birthday or user account number. Examples of the questions described here are only illustrative and various other questions may be asked by front end interface module 220. The questions asked by front end interface module 220 may be pre-recorded. Additionally, or alternatively, the questions asked by front end interface module 220 may be selected based on the information provided by the user. The information provided by the user may first be analyzed by data analysis module 130, and data analysis module 130 may provide questions to front end interface module 220 for the user. In various embodiments, front end interface module 220 may initially use a generic VA for interaction with the user prior to collecting additional information from the user. The term "generic VA" refers to a default VA that may be configured based on expected preferences for an average user. For example, the default VA may have a female voice and communicate using American English. In some embodiments, for cases when the user has an associated user profile with an associated user VA, front end interface module 220 may configure an associated user VA for initial interaction with the user.

In some embodiments, front end interface module 220 may be configured to prompt the user to provide personable identifiable information such as a name of the user, an account number of the user, a telephone number of the user, a social security number of the user, a driver license of the user, or any other user-specific information. The user may provide information as audio data, video data, graphics data, text data, etc.

Data handling module 110 may be configured to process user requests via a transcription module 222. For example, for a user request containing audio data, transcription module 222 may transcribe the audio data into text using a speech-to-text (STT) engine. The STT engine may, for example, use neural network models to convert audio signals into text. In some embodiments, the STT engine may recognize various languages. In some embodiments, the STT engine may be trained to recognized dialects and/or accents of languages. The STT engine may include an ensemble of neural network models, with each model trained to recognize a particular type of audio signals. In some embodiments, illustrative neural network models may be trained to recognize British English, Spanish, or audio signals associated with a female voice. Examples of the neural network models are only illustrative and various other models may be used by transcription module 222 to recognize and transcribe audio signals into text. The audio signals that cannot be identified as words may be transcribed as a text string identifier such as "inaudible" or another appropriate string identifier. Transcription module 222 may transmit the transcribed data to data analysis module 130 via back end interface module 228 for data analysis and interpretation of the user request.

In various embodiments, transcription module 222 may include special alphanumerical characters or symbols (or combinations of alphanumerical characters and/or symbols) in the transcribed text data indicating other characteristics of a user speech. For example, similar to musical notes, the characters or symbols may record the sound volume of the user speech, as well as pitch and tempo of the speech, and related characters and/or symbols that are used to record music. In some embodiments, transcribed text data may contain text characters, words, and phrases containing "tags." In various embodiments, the tags may include special alphanumerical characters or symbols (or combinations of alphanumerical characters and/or symbols) indicating other characteristics of a user speech as described above.

Transcription module 222 may process other user communication data. For example, transcription module 222 may obtain text data associated with the user communication and transmit the text data to data analysis module 130 via back end interface module 228 for analysis of text data. In some embodiments, when the user communicates with server system 135 using a software application with a graphical user interface (GUI), transcription module 222 may transcribe user actions relating to the user interacting with elements of GUI. In an embodiment, an illustrative element of GUI may include a button, a dropdown list, a radio button, a search field, a command field, or any other graphical element that may represent a user-defined command. In some embodiments, transcription module 222 may transcribe user action associated with operating a telephone or other communication equipment containing physical controls such as, for example, buttons. In some embodiments, transcription module 222 may receive video data associated with a video call from a user and transcribe the audio portion of the video call. Transcription module 222 may store the data associated with the video call in database 170.

Transcription module 222 may transmit the transcribed data to server system 135 and store both audio and transcribed data in database 170. In various embodiments, the transcribed data may be parsed by a parsing module 224 shown in FIG. 2. The transcribed text data may be transmitted to parsing module 224 from database 170. Parsing module 224 may parse transcribed text data using a language parser to produce identified data objects. The language parser may assign labels to data objects of the transcribed text data, including labels identifying parts of speech. For example, the labels identifying parts of speech for the transcribed text data objects may be used as additional information when transcribed text data is processed by data analysis module 130.

Data handling module 110 further may contain a verification module 226 for verifying the meta-data associated with the user communicating with interaction system 105. Verification module 226 may compare the meta-data obtained during the communication with a user with the stored meta-data for the user. For example, for cases when the user has an associated user profile containing meta-data, verification module 226 may verify that meta-data obtained during the communication with the user matches the previously stored meta-data. In some embodiments, verification module 226 may check social network services such as Facebook or LinkedIn to obtain the additional information about the user. In some embodiments, the collected communication related data may be parsed using parsing module 224 to extract the needed meta-data information. In some embodiments, verification module 226 may validate meta-data by cross-referencing meta-data extracted from different sources. For example, verification module 226 may obtain the address information from the White Pages and compare it to the address information associated with the user profile. In an example embodiment, data handling module 110 may ask for a credit card number of the user, may request verification module 226 to retrieve the address and the phone number associated with the user credit card number, and may use verification module 226 to verify the address by comparing it with address retrieved from other sources such as, for example, user profile or social network account.

In some embodiments, in order to verify meta-data associated with a user, data handling module 110 may ask the user a set of verifiable questions. For example, data handling module 110 may prompt the user to communicate her/his credit card number, social security number, address, name, security questions, user id, pin number, password and/or account number. Data handling module 110 may use transcription module 222 to transcribe the user audio data. Data handling module 110 may parse the transcribed stream data using parsing module 224 to retrieve the valuable information. Data handling module 110 may then use verification module 226 to verify the data obtained from parsing the transcribed data of the information communicated by the user against the user profile and other available information.

Verification module 226 may be configured to verify that all the needed information is collected and there is no information mismatch. For example, verification module 226 may verify that the address for the user is correctly recorded as compared to other sources of information. In case more information is required from the user, data handling module 110 may be configured to prompt the user for clarification of existing information or to ask the user to verify or add new information.

Data handling module 110 further contains a back end interface module 228. Back end interface module 228 is responsible for communication with server system 135 as well as with other modules of interaction system 105. For example, back end interface module 228 is configured to interface with user profile module 120, data analysis module 130 and virtual assistant module 140. In addition, back end interface module 228 may store and retrieve data from database 170.

In various embodiments, sub-modules of data handling module 110 may include associated computing resources such as processors and memory devices for storing instructions. The processors may be configured to execute software instructions to perform various operations related to functions of the sub-modules.

Figure 3:
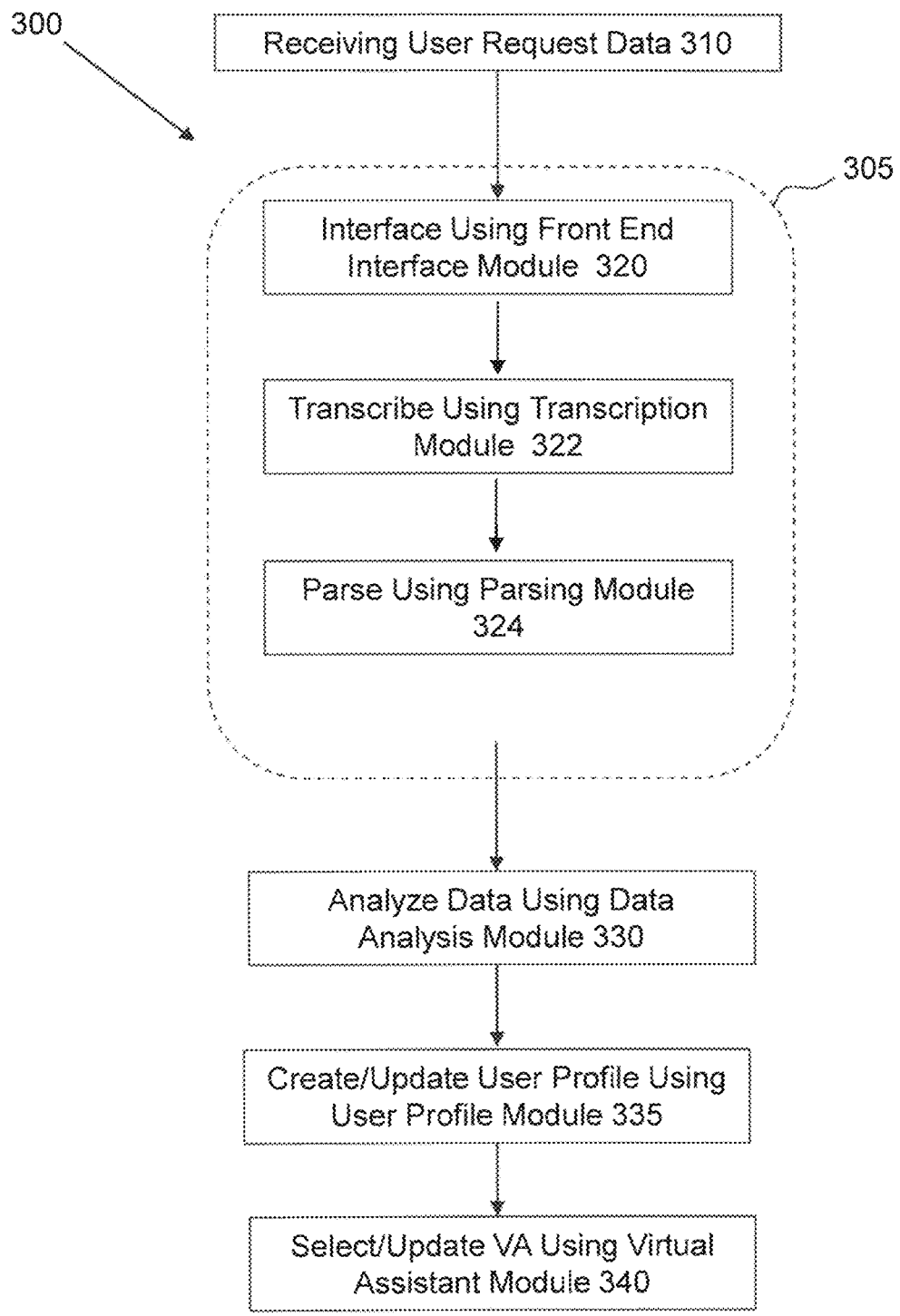
FIG. 3 is a flowchart of an illustrative process of configuring a virtual assistant.

FIG. 3 is a flowchart of an illustrative process 300 of configuring a VA for a user. Process 300 shows an overview of the operation of interaction system 105, and details of various steps of process 300 will be discussed further below after briefly reviewing the process.

In step 310, interaction system 105 may receive data related to a request from a user. For example, the data may be audio, video, text or graphical data. The data may include audio or video streaming data, or it may include a paragraph of a text, bitmap image, vector graphics or/and a combination of thereof. The request may be handled by various modules of data handling module 110 in a group of steps 305. In step 320, for example, data handling module S110 may interface with a user via front end interface module 220 by asking the user a set of questions. For example, front end interface module 220 may ask the user to describe the type of the request as well as to authenticate with the system using personable identifiable information (PII). In step 322 of process 300, transcription module 222 may transcribe the audio data associated with the user request, and in step 324, parsing module 224 may parse the transcribe data for keywords and meta-data. In step 330 of process 300, the transcribed and audio data may be analyzed by data analysis module 130. Data analysis module 130 may have various functions and is one of the main modules for configuring a VA for a user. Various elements of data analysis module 130 will be explained further below. In step 335 of process 300, user profile module 120 may be configured to create or update the user profile. The data for creating or updating the user profile may be transmitted from data analysis module 130. Various elements of user profile module 120 will be explained further below. In step 340 of process 300, the VA may be configured, that is, selected and/or updated, based on the user profile data as well as the data transmitted from data analysis module 130. Details of configuring and updating a VA for optimal user experience are described further below.

The process 300 may be an iterative process. For example, once the VA is configured in step 340, new data associated with the user request may be received in step 310, and process 300 may be repeated. In cases when data associated with the user request includes audio or video streaming data, the data may be partitioned into intervals and for each interval, process 300 may be used to update the VA. In some embodiments, the streaming data may be partitioned into intervals corresponding to the pauses within the streaming audio data. In some embodiments, the streaming data may be partitioned into intervals corresponding to the completion of the speech of the user.

Figure 4:
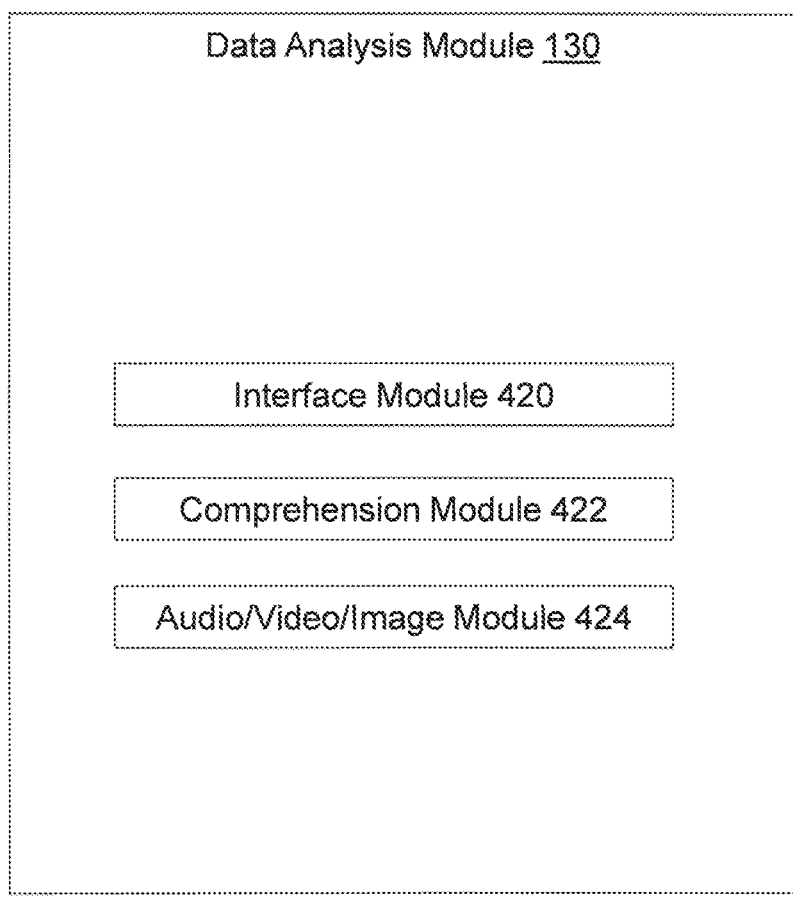
FIG. 4 is a diagram of an illustrative data analysis module.

FIG. 4 is a block diagram of an exemplary data analysis module 130, consistent with disclosed embodiments. Data analysis module 130 may be used to process transcribed audio data as well as text, video and graphics data associated with the user request. In various embodiments, data analysis module 130 may include an interface module 420 for interacting with other modules of system 150 and for interacting with server system 135. Data analysis module 130 may also include a comprehension module 422 for understanding the user request and preparing a reply for a user, and an audio/video/image module 424 for analyzing audio characteristics associated with the user request.

Interface module 420 may transmit audio, video, text and graphics data to other modules of the data analysis module. For example, interface module 420 may transmit the transcribed text data to comprehension module 422. The interface module may transmit the audio/video signal associated with the user request to the audio/video/image module.

Comprehension module 422 may be used to analyze transcribed data associated with the user request. For example, the comprehension module may be used to analyze the type of request associated with the user communication. The system may, for example, analyze the user speech and determine the reason for the user's request. In some embodiments, the system may use natural language processing to determine the subject matter of the request. For example, the comprehension module may determine that the user request may be associated with the theft of a credit card, or that the user request is related to opening a bank account or completing a purchase transaction. The comprehension module may determine the user request by analyzing the key words found in transcribed text data. Additionally, or alternatively, the comprehension module may determine the user request by providing a user with questions, such as multiple-choice questions, using data handling system 110. In some embodiments, the comprehension system may attempt to determine the type of the user request based on natural language processing using various algorithms developed for natural language processing that may include regular expressions, artificial neural networks, n-gram language models, logic regression, vector semantics, part-of-speech tagging, recurrent neural networks, and/or the like. For example, the comprehension module may use key phrases to attempt to determine the type of the user request.

Comprehension module 422 may be configured to verify with the user the determined type of request by asking the user (via data handling module 110) to confirm the request type determined by comprehension module 422. In cases when comprehension module 422 cannot correctly identify the type of request from the user, the comprehension module may be configured to present the user with questions designed to narrow down the type of request associated with the user communication. The questions may require the user to answer "yes" or "no". For example, comprehension module 422 may prompt the user to answer "Are you calling to report a loss of the credit card? Please answer yes or no." After receiving a reply "yes" from the user, comprehension module 422 may proceed to ask the user "Would you like to suspend the card, or would you like to cancel the card?" In various embodiments, comprehension module 422 may select questions for the user resulting in a set of expected answers. For example, for a question "would you like to suspend the card, or would you like to cancel the card?" the set of expected answers may be "suspend" or "cancel." In some embodiment, the user may answer "the card was lost yesterday, and I would like to suspend it for now" and the comprehension module may be configured to determine that the card needs to be suspended. In some embodiments, the user may answer "I am reporting a theft of the credit card" and comprehension module 422 may be configured to determine that the card needs to be canceled.

Comprehension module 422 may include an algorithm based on decision trees to determine the type of reply from the user. In general, if there is a degree of uncertainty related to the user answer, the comprehension module may be configured to verify the user answer. In various embodiments, comprehension module 422 of data analysis module 130 is configured to interact with the user via the VA and via data handling module 110. In various embodiments, comprehension module 422 may receive the transcribed data from data handling module 110, analyze the transcribed data, and select an appropriate response. In an embodiment, the comprehension module may select an appropriate response from the list of possible pre-compiled responses. Additionally, or alternatively, the comprehension module may select an appropriate response by combining information obtained from the user request and user related information obtained from extraneous sources with pre-compiled responses. For example, the pre-compiled response may follow the pattern "NAME, before you lost your credit card, was your last transaction at PLACE for the amount of AMOUNT1 dollars and AMOUNT2 cents?", the pre-compiled response containing the tokens NAME, PLACE, AMOUNT1 and AMOUNT2. Comprehension module 422 may substitute tokens with the user related information, to result in a response "Jane, before you lost your credit card, was your last transaction at Olive Garden for the amount of twenty five dollars and forty nine cents?"

Comprehension module 422 may further identify the proficiency level of the user speech, that is a level of proficiency of English language (or whatever language is implemented in system 105), characterized by vocabulary and grammar usage of the user. Comprehension module 422 may additionally identify a choice of words (e.g., vocabulary or colloquialisms) for the user and select the response based on the choice of words. In some embodiments, the words in the pre-compiled responses may be substituted with synonym words chosen to match the vocabulary of the user.

In various embodiments, comprehension module 422 may be configured to process transcribed text data to extract characteristics associated with the user or with the user request. In some embodiments, comprehension module 422 may include neural networks, recurrent neural networks (RNN) or convolutional neural networks (CNN) to process the text data to identify various characteristics of the user. In some embodiments, a specific computer model (CM) (e.g., recurrent neural network) may be trained to identify a specific feature of the text data associated with the user request.

Data analysis module 130 may further include an audio/video/image module 424 for processing the audio video and image data, and for analyzing audio characteristics associated with the user request. In various embodiments, audio/video/image module 424 may analyze a pitch, a tone, a cadence of the user speech, volume and a rate of a user speech to extract various characteristics from the speech. For example, audio/video/image module 424 may identify a gender of the user, an age of the user, a dialect of the user, an accent of the user speech, a tone of voice, an emotional content of the speech, or any other aspects that uniquely identify the user based on the audio video or image characteristics of the receiving data. In some embodiments, when the user is communicating with interaction system 105 using video data, audio/video/image module 424 may identify the characteristics of the user (e.g., age, gender, ethnicity, hand gestures, facial expressions, body movements, and the like) associated with the video streaming data.

In some embodiments, audio/video/image module 424 may be configured to transmit information regarding the user characteristics to user profile module 120. In some embodiments, data analysis module 130 may be configured to instruct virtual assistant module 140 to synthesize speech of a VA to match the proficiency level, gender, and age associated with the user characteristics, to improve user experience.

In some embodiments, the user may transmit an image to audio/video/image module 424. For example, the user may transmit an image of his car having a flat tire, and audio/video/image module 424 may use image recognition to identify the type of service the user needs based on the image characteristics. For example, audio/video/image module 424 may identify the type of car and the type of spare tire that the user might need.

In various embodiments, audio/video/image module 424 may be configured to process audio video and image data to extract characteristics associated with the user or with the user request. In some embodiments, audio/video/image module 424 may include neural networks, recurrent neural networks (RNN) or convolutional neural networks (CNN) to process the audio data to identify various characteristics of the user. In some embodiments, a specific computer model (CM) (e.g., recurrent neural network) may be trained to identify a specific feature of the audio, video or image data associated with the user request. For example, a first CM may be used to identify the age of the user, and a second CM may be used to identify the emotional content of the user. The first CM may, for example, take a sample of the audio data associated with the user request and output the most probable range for the age of the user, while the second CM may take a sample of the audio data associated with the user request and output a set of emotions that are most likely experienced by the user during the request. The set of emotions, for example, may be {"happy", "content", "patient" } or {"sad", "impatient", "aggressive", "scared"}. In some embodiments, a CM may be trained to recognize human emotions using a combination of verbal expressions and facial expressions obtained from the video data associated with the user request. In some embodiments, a CM may be trained to recognize a dialect of a user. In various embodiments, multiple CMs may be employed by audio/video/image module 424 to obtain characteristics associated with the user request.

The data received by data handling module 110 and analyzed by data analysis module 130 may be submitted for processing to user profile module 120. User profile module 120 may store characteristics associated with the user and the user request in a computer readable storage medium. For example, user profile module 120 may transmit the data associated with the user to database 170 of server system 135. In some embodiments, user profile module 120 may check if a user profile exists for the user communicating with interaction system 105, and create the user profile if it does not exist. If the user profile is already established for the user communicating with interaction system 105, user profile module 120 may update the user profile. User profile module 120 may identify the user profile based on one or more meta-data characteristics associated with the user obtained from data handling module 110 communicating with user profile module 120. For example, user profile module 120 may compare the phone number of the user making the request with the phone numbers stored in database 170 to identify the user profile. Additionally, or alternatively, the user profile module may identify the user profile based on the user name, user identification numbers such as social security number, driver license, password, account number, and the like.

Figure 5:
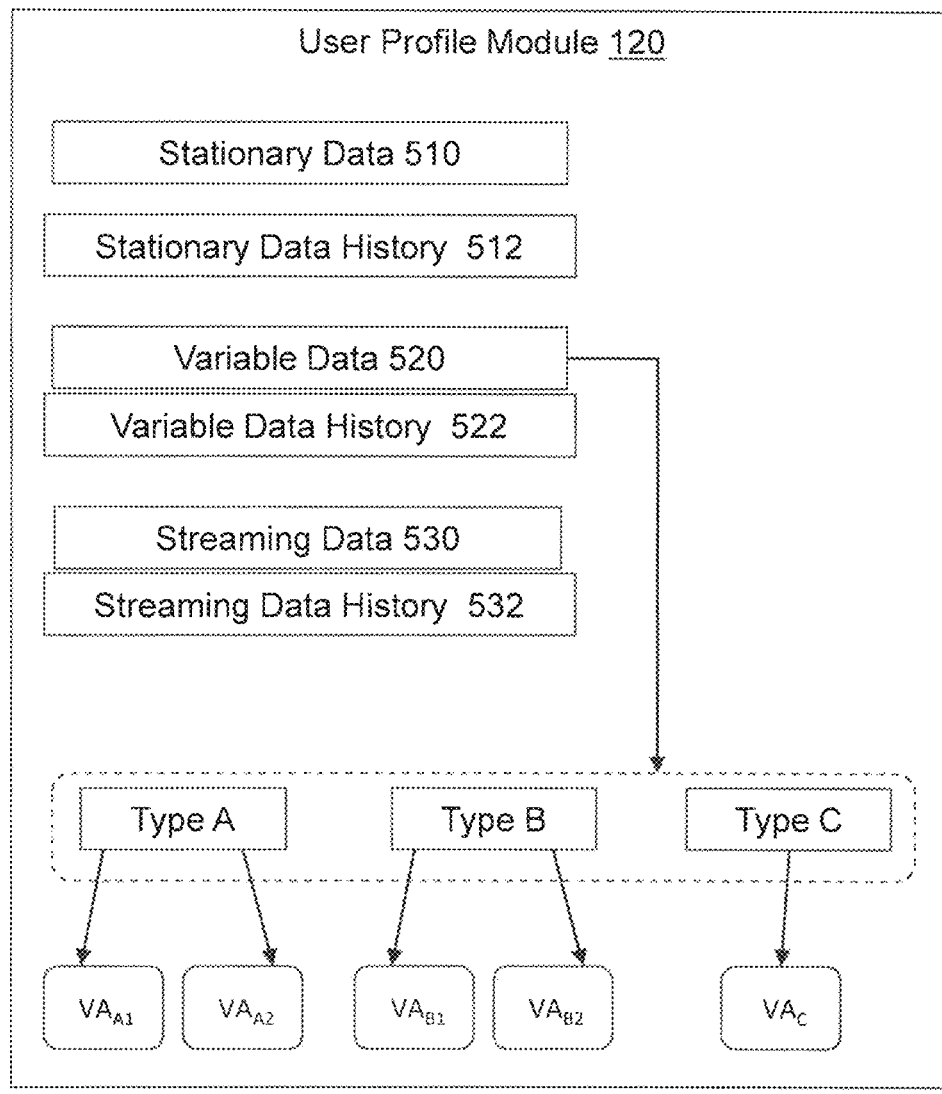
FIG. 5 is a diagram of an illustrative user profile module.

FIG. 5 is a block diagram of an exemplary user profile module 120, consistent with disclosed embodiments. User profile module 120 may be used to process and store data associated with the user request. In various embodiments, user profile module 120 may store stationary data 510 and a history of stationary data 512. Stationary data 510 may be meta-data for the user that does not change or slowly changes with time. For example, the stationary data may include personable identifiable data (e.g., social security number, driver license, user id, password, account number, user name, user phone number, user address, user IP address) as well as user age, accent, language, dialect, gender, personality type and/or the like. Stationary data 510 may be verified for each user communication to ensure that it has not been changed.

In various embodiments, user profile module 120 may store variable data 520 and a history of variable data 522. Variable data 520 may be related to meta-data for the user that changes from one communication to another. Variable data 520 may include the type of request from the user, the location of the user, user device 103A-103C used for interaction with the system 105, the type of network 115 used for communication, the type of communication (e.g., audio, video, or text), the environment of the user during the communication with interaction system 105, etc.

In various embodiments, user profile module 120 may store streaming data 530 and a history of streaming data 532. Streaming data 530 may be related to audio or video data for the user during the communication with interaction system 105.

In various embodiments, user profile module 120 may receive the data that was first processed by either data handling module 110 and/or data analysis module 130. For example, the audio streaming data may be first processed by data handling module 110 by transcribing the audio signal into text data. Both the transcribed data and the original audio signal may be transmitted to user profile module 120 and stored as a streaming data 530. Similarly, the meta-data associated with stationary data 512 and variable data 520 may be processed by data handling module 110 and/or data analysis module 130 before storing it using user profile module 120.

In various embodiments, the variable data may include the type of the request associated with a user communication. For example, the request type may include "lost or stolen credit card," "opening checking account," "checking account balance," and/or the like. FIG. 5 shows that configuration of a VA by user profile module 120 may involve selecting from among a plurality of types of pre-configured VAs (for the same user) depending on the type of request associated with the user communication. For example, FIG. 5 shows that for the type of request "Type A", user profile module 120 may select either $VA_{A1}$ or $VA_{A2}$. The choice of $VA_{A1}$ or $VA_{A2}$ may be decided based on other data associated with the user request, such as other variable data 520, or streaming data 530. Similarly, FIG. 5 shows that for the type of request "Type B", user profile module 120 may select either $VA_{B1}$ or $VA_{2B}$, and for the type of request :Type C" user profile module 120 may select $VA_C$. It should be noted, that describe embodiments for selecting or configuring VAs based on the user profile data are only illustrative and other embodiments may be considered. For example, VA may be selected and configured based on stationary data 510 without regard to the type of request associated with the user communication.

Figure 6:
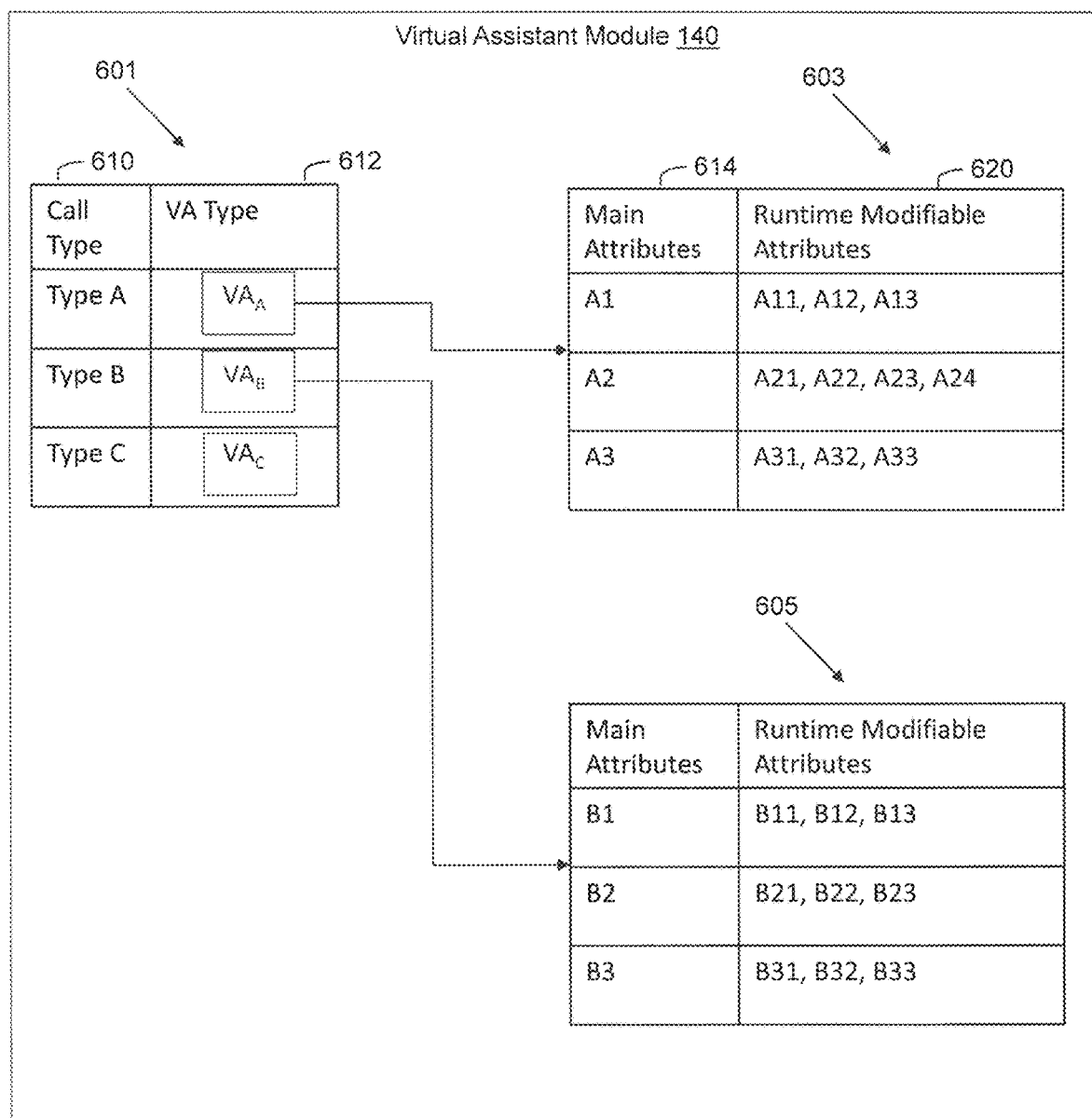
FIG. 6 is a diagram of an illustrative virtual assistant module.

In certain embodiments, VAs may have various attributes specified by a virtual assistant module 140. FIG. 6 shows a block diagram of exemplary elements related to attributes of VAs consistent with disclosed embodiments. In some embodiments, virtual assistant module 140 may be configured to associate a pre-stored VA with a type of a request from a user. For example, table 601, depicted in FIG. 6, shows (column 610, table 601) the request types "Type A"-"Type C" and corresponding VA (column 612, table 601) $VA_A$-$VA_C$. Each VA may have various associated attributes shown in tables 603 and 605. For example, $VA_A$ may have main attributes (column 614, table 603) and runtime modifiable attributes (column 620, table 603). The main attributes of the VA, such as attributes A1-A3 illustrated in (column 614, table 603) may include language of the VA, vocabulary of the VA corresponding to a profile of a user, the age and/or gender of the VA as well as the base pitch, tempo and loudness of the VA voice.

Each main attribute such as Ai, illustrated in FIG. 6, may have related runtime attributes Aij, where index i indicates the associated main attributes, for example, i={1,2,3}, and index j indicates the associated runtime attributes, for example, j={1,2,3,4}. For example, the main attribute (A1) may be audio characteristics of the voice of the VA, and the runtime attributes may be the pitch (A11), the volume (A12) and the tempo of the speech of the VA (A13). In an example embodiment, the main attribute (A2) may be the vocabulary of the VA and the runtime attributes may be vocabulary proficiency level (A21), vocabulary containing specialized terminology (A22), southern dialect and vocabulary (A23) and/or northeastern dialect and vocabulary (A24). In another example, the main attributes may include languages such as British English (A21), American English (A22), Chinese (A23), Greek (A24) and/or the like. It should be noted, that the described attributes of VAs are only illustrative and other attributes may be considered. FIG. 6 shows that VAs $VA_A$-$VA_C$ may have corresponding main attributes and runtime attributes. For example, $VA_B$ may have main attributes Bi, and runtime attributes Bij, shown in table 605, where index i may be, for example, i={1,2,3}, and index j may be, for example, j={1,2,3}.

In various embodiments, virtual assistant module 140 may be configured to change runtime modifiable attributes gradually during the communication with the user. For example, virtual assistant module 140 may be configured to change the volume or pitch of the VA. In general, the changes in runtime modifiable attributes may be based on the feedback received from the user audio, video, graphics or text data during communication with interaction system 105. The feedback may be obtained by analyzing user interaction with interaction system 105 via data handling module 110 and data analysis module 130. In some embodiments, data analysis module 130 may determine emotional content of the user in communication with interaction system 105, and transmit the instructions to virtual assistant module 140 for modifying the runtime modifiable attributes during the communication with the user. For example, if data analysis module 130 receives information that the user is impatient, data analysis module 130 may instruct virtual assistant module 140 to increase the rate of speech of the VA.

In some embodiments, data analysis module 130 may evaluate satisfaction of the user and may indicate that the user is not satisfied with a VA. The term "user satisfaction" refers to one of the characteristics of the emotional state of the user. Data analysis module 130 may, in real-time, dynamically communicate to virtual assistant module 140 to change attributes of a VA. In some embodiments, virtual assistant module 140 may be instructed to mirror the rate of speech of the user, or the cadence of the speech. In some embodiments, the cadence of the speech can be selected to reduce user dissatisfaction. The term "user dissatisfaction" refers to lack of user satisfaction.

In some embodiments, data analysis module 130 may assign a satisfaction score, or value, to the user satisfaction based on a function that maps the user speech characteristics pertaining to the user emotional state to numerical values. Such function may, for example, include a neural network, recurrent neural network or convolutional neural network. In an illustrative embodiment, the positive satisfaction values of this function may correspond to the user satisfaction and the negative satisfaction values of this function may correspond to the user dissatisfaction.

In some embodiments, data analysis module 130 may select a reply for the user that may reduce the user dissatisfaction. For example, data analysis module 130 may include phrases indicating that VA understands the request from the user and is currently pursuing a solution. For example, data analysis module 130 may include phrases such as "we understand that there is a problem with your authentication." Similarly, if data analysis module 130 indicates that the user's sentiment is becoming more negative, data analysis module 130 may instruct interaction system 105 to transfer the communication to a live agent. The term "live assistant" or "live agent" refers to an actual human being that may assist a user during the communication with the interaction system.

Figure 7:
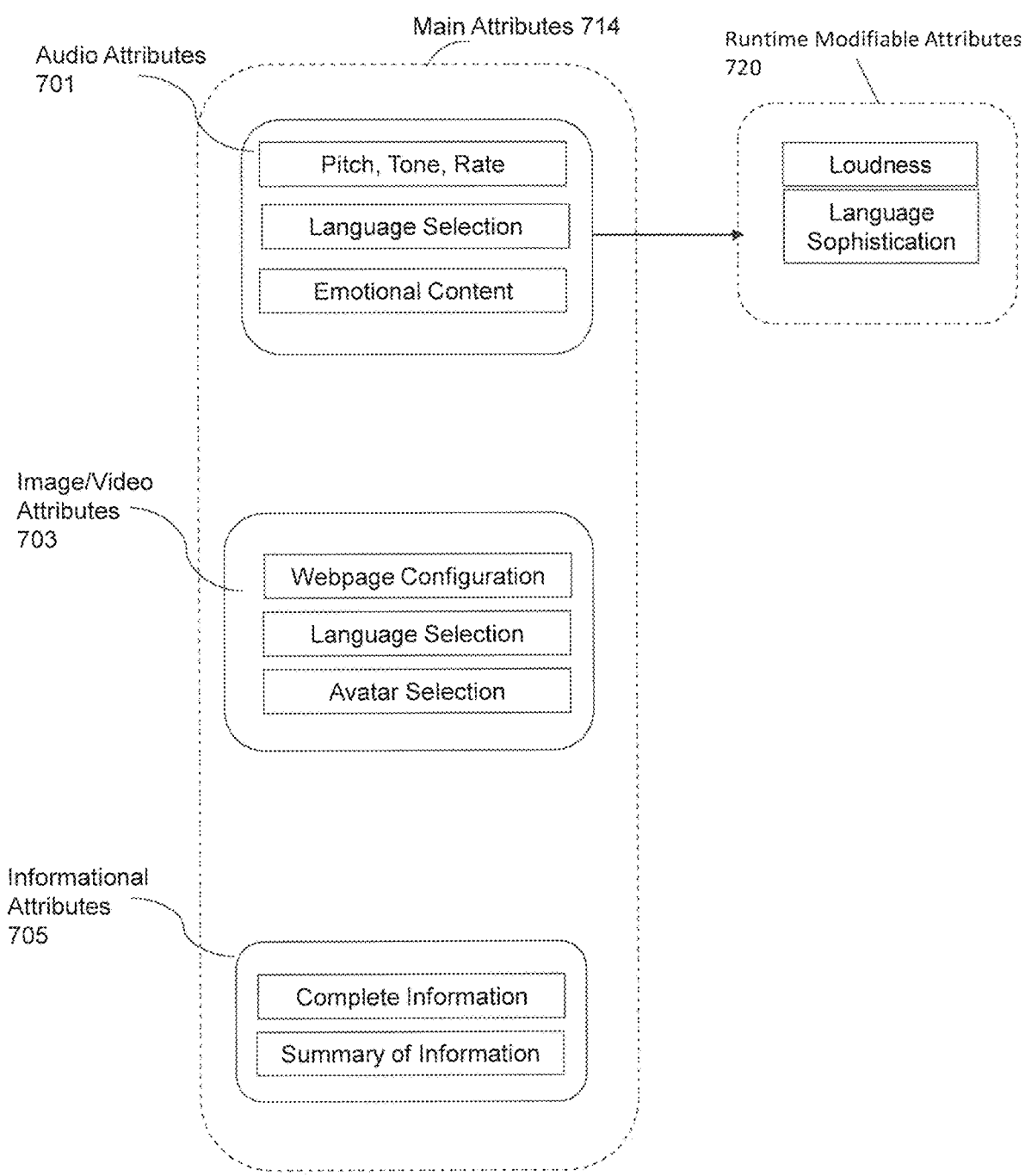
FIG. 7 is a diagram of example attributes of a virtual assistant.

FIG. 7 shows a block diagram of exemplary elements related to attributes of virtual assistants in accordance with disclosed embodiments. For example, main attributes 714, similar to main attributes 614 of table 603 described in FIG. 6, may include audio attributes 701, image/video attributes 703, and informational attributes 705. Audio attributes 701 may include pitch, tone, rate of speech, language, and emotional content. Audio attributes 701 may include runtime modifiable attributes 720 similar to runtime attributes 620 of table 603 described in FIG. 6. For example, runtime modifiable attributes 720 may include loudness or language sophistication. Image/video attributes 703 may include the graphical and/or video details associated with a graphical/video communication. For example, image/video attributes 703 may include display configuration of a webpage, selection of a language on the webpage and/or avatar selection for video communications. Informational attributes 705 may include levels of detail related to information provided for the user during user communication with interaction system 105. In some embodiments, the level of detail may be selected to provide the user with complete information available to interaction system 105 regarding the user request, and in some embodiments, the level of detail may be reduced. The level of detail may be selected based for example on the type of request of the user. For example, for cases when the request from the user is of emergency type, the level of detail related to the information provided for the user may be reduced.

Figure 8:
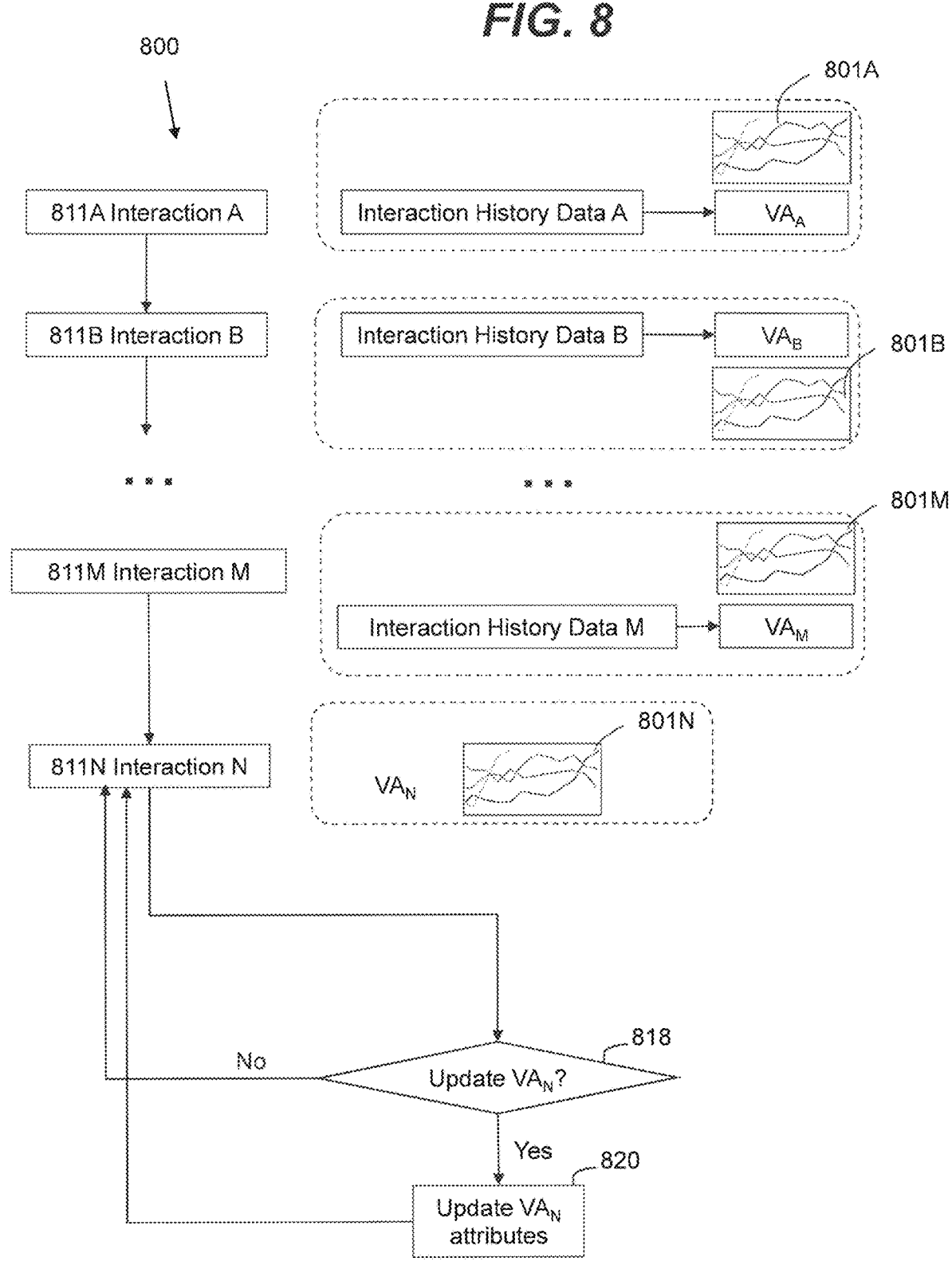
FIG. 8 is a flowchart of an illustrative process of configuring a virtual assistant.

FIG. 8 is a flowchart of an illustrative process 800 for configuring a VA for a user based, at least in part, on previous user interactions with interaction system 105. In step 811A, the user may interact with interaction system 105 for example, for the first time. The data associated with interaction history (interaction history data A) may be recorded via user profile module 120 in database 170 of server system 135. In various embodiments, the interaction history data A may include the data related to attributes of the VA ($VA_A$) used for interaction with the user in step 811A as well as changes in the attributes schematically described by graphs (also referred to as timetables in some cases) 801A. For example, the changes in the attributes may be related to the changes in runtime modifiable attributes 620 such as sound volume, a tone of voice, or emotional content of the $VA_A$. The changes in the runtime modifiable attributes are schematically graphed as a function of time of communication in 801, and can be stored as a part of interaction history data A. The user may interact with interaction system 105 in steps 811B-811M and the data associated with interaction history (interaction history data B through M and related graphs 801A-801M) may be recorded via user profile module 120. In an example embodiment, the user may interact with interaction system 105 in steps 811N and interaction system 105 may configure $VA_N$ for the interaction in step 811N, based on the audio, video, graphics and text data received in step 811N during the user communication with interaction system 105 as well as interaction history data A-M and associated $VA_A$-$VA_M$.

In an example embodiment, in step 818, data analysis module 130 may evaluate if the attributes for the $VA_N$ need to be updated. Data analysis module 130 may compare the user interaction data with the interaction history data A-M and configure attributes for $VA_N$ that match the attributes of one of the $VA_A$-$VA_M$, related to the interaction history data A-M that closely matches the data associated with the user interaction data in step 811N. In an example embodiment, data analysis module 130 may further compare the user interaction data with the interaction history data A-M and select the timetable for changes 801N in runtime modifiable attributes of the $VA_N$ that matches one of the timetables 801A-801M that is related to one of the interaction history data A-M that closely matches the interaction data associated with user communication in step 811N. It should be noted, that the process of selecting attributes for the VA described above in step 818 is only illustrative and other approaches for selecting attributes for the VA may be considered. For example, some of the runtime modifiable attributes of the $VA_N$ may be obtained as a weighted average of the attributes of $VA_A$-$VA_W$, where the weights $W_A$-$W_M$ may be related to a "measure function" between the data associated with user interaction in step 811N and interaction history data A-M. The term "measure function" refers to a function that may determine how closely the aspects of the data associated with the user interaction in step 811N are related to interaction history data A-M. For example, if the interaction history data A includes user communication with interaction system 105 using average speech rate of $R_A$, and the data associated with the user interaction in step 811N includes user communication with interaction system 105 using average speech rate of $R_N$, then the measure function $F(R_A, R_N)$ may be for example, $(R_A-R_N)^2$. It should be noted, that more complicated measure functions may be introduced to accurately determine how closely the aspects of the data associated with the user interaction in step 811N are related to interaction history data A-M. For example, the measure function may incorporate several characteristics of the user speech, such as average pitch (P) and rate and the combined measure function may be, for example, defined as $\sqrt{(R_A-R_N)^2+(P_A-P_N)^2}$. It should be noted, that the described measure functions are only illustrative and other measure functions may be used.

FIG. 8 shows that in step 818, if $VA_N$ needs to be updated (step 818, Yes), process 800 proceeds to step 820 of updating $VA_N$. After completing the update in step 820, process 800 proceeds to step 811N for continuing interacting with the user and acquiring user characteristics related to the user communication with interaction system 105. Alternatively, if $VA_N$ does not require updates (step 818, No) process 800 proceeds to step 811N.

Figure 9:
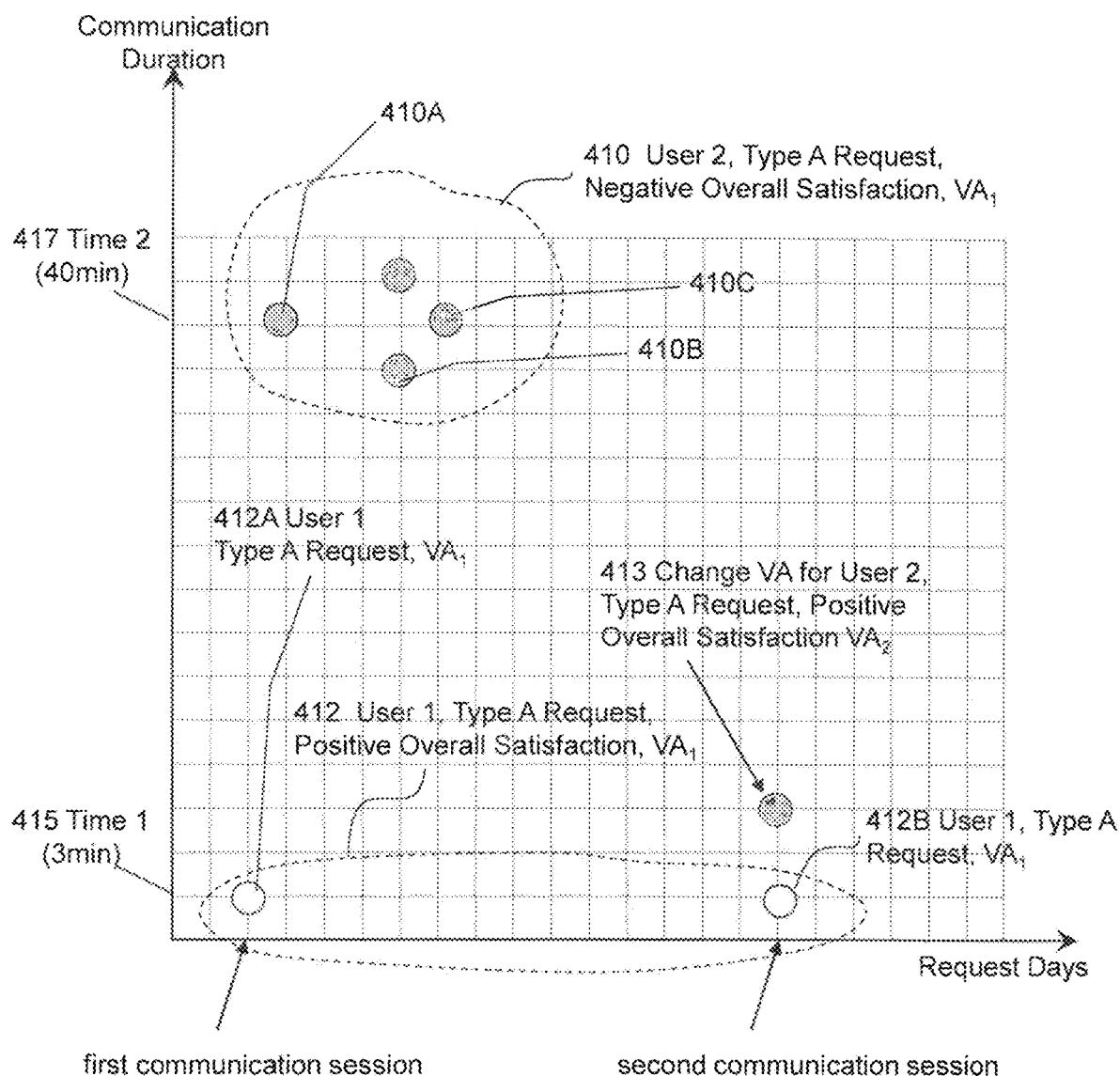
FIG. 9 shows an illustrative configuration of a virtual assistant based on user satisfaction statistics.

FIG. 9 shows an illustrative graph of communication duration during the user communication with interaction system 105 for several consecutive communication sessions. The term "communication session" refers to an entirety of one continuous communication between a user and a system such as interaction system 105. As described in FIG. 9, interaction system 105 may be configured to monitor the duration of the communication with the user to evaluate the user experience. In addition, interaction system 105 may monitor emotional content of the user during user communication. Interaction system 105 may select the same or a similar VA configuration that resulted in a user overall satisfaction (i.e., overall satisfaction is positive) during previous communication sessions. The term "overall satisfaction" or "general satisfaction" over a period of communication time, such as communication session, may refer to an averaged satisfaction score calculated over the period of communication time. For example, the averaged satisfaction score may be calculated as $1/\Delta t \int SS(t)dt$, where $\Delta t$—is a duration of the communication, $SS(t)$—is a satisfaction score as a function of time, and the integral is calculated over the period of time $\Delta t$. Alternatively, interaction system 105 may select a different VA configuration if the user was generally dissatisfied (i.e., the overall satisfaction is negative) during previous communication sessions. The user satisfaction may be based on the emotional content of the user during user communication with interaction system 105 as well as the duration of the user communication.

In an example embodiment illustrated in FIG. 9, a first communication session 412A for a user 1 for a "Type A" request, may lasted a short time (3 min as shown in FIG. 9) indicating, in some cases, an overall user satisfaction during the communication. During the first session, $VA_1$ may be used for the communication. During a second communication session 412B, for a "Type A" request, the user 1 may again spent a short time (about 3 min as shown in FIG. 9) indicating, in some cases, a positive overall user satisfaction 412 during the communication.

FIG. 9 further illustrates a communication session 410A, for a user 2 for a "Type A" request that may lasted a long time (40 min as shown in FIG. 9). User 2 may have several more communication sessions for the same "Type A" matter, such as the communication sessions 410B and 410C that also lasted for a long period of time, indicating an overall dissatisfaction 410 for user 2. During another communication session 413 for user 2, interaction system 105 may have analyzed the user communication data associated with communication sessions 410A-410C using data analysis module 130 and configured a new VA ($VA_2$ as shown in FIG. 9) resulting in a much shorter communication time, and consecutively a positive experience for the user 2.

In some embodiments, system 105 may be configured to calculate running average satisfaction scores of user satisfaction for one or more communication sessions. For example, the running average satisfaction score for sessions 410A-410C may include calculating an average value of the average satisfaction score for sessions 410A-410C. In some embodiments, system 105 may use the running average satisfaction score, and a change in the running average satisfaction score from one communication session to another, as statistical data that can be used to configure or update VA attributes. For example, FIG. 9 shows that user 2 may be dissatisfied during communication sessions 410A-410C. The running average satisfaction score may not change significantly from session 410A to session 410C resulting in system 105 updating VA attributes for session 413.

In various embodiments, system 105 may be configured to collect statistical data related to user communication. For example, data analysis module 130 of system 105 may collect the average value of at least one user characteristic during the conversation. In some embodiments, module 130 may calculate an average of a user characteristic over a selected time window, and compute the running average value of the user characteristic. For example, module 130 may calculate a running average of average user pitch over a time window of 10 seconds and monitor and/or store the running average. In some embodiments, various other statistical data may be collected. For example, module 130 may compute a variance of a user characteristic over a select time window. In some embodiments, module 130 may compute a covariance of a first user characteristic and a second user characteristic. In some embodiments, module 130 may monitor and/or store the running variance of the user characteristic or running covariance of the first and second user characteristic.

In various embodiments, the selection of an appropriate time window for computing statistical data may be determined based on data from various communication sessions. In some embodiments, multiple running time windows may be used. For example, the first time window may be 10 seconds and the second time window may be the time over which the entire communication session extends. In some embodiments, data analysis module 130 may select a variable length time window to partition real-time streaming audio data based on pauses within the streaming audio data. In some embodiments, the first variable length time window may correspond to one instance of a request from the user or a user reply, and the second variable length time window may correspond to another instance of a request or reply from the user. In an example embodiment, a time window may be selected by data analysis module 130 based on a corresponding rate of spoken words identified in the real-time streaming audio or video data received from the user.

In various embodiments, the average value of user characteristics (averaged over an appropriate time window selected during user communication session) may be used to configure or update a VA. For example, if the averaged value of a user characteristic is changing significantly at a point in time (or during a time interval) during user communication session, system 105 may be configured to update VA attributes. For example, system 105 may chose to update VA attributes to result in an increased running average satisfaction score for the user. In some embodiments, system 105 may analyzes changes in average values of user characteristics based on historic data for one or more users, and select an appropriate update to VA attributes according to historic updates to VA attributes that led to improved results, such as, for example, increased running average satisfaction score for a user.

In some embodiments, interaction system 105 may be configured to transfer a user to a live assistant for further help, for example, if a duration of a communication session for a user with a user configured VA exceeded a specified threshold. The specified threshold may be dependent on the type of the user request. For example, the specified threshold may be only a few minutes for an emergency type request and may be tens of minutes for a request that is not related to the emergency. In some embodiments, interaction system 105, based on data analysis performed by data analysis module 130, may identify a live agent having personality traits that may be suitable for communicating with the user. For example, various live agents may have attributes that are similar to the attributes of VA, such as gender, age, accent, a rate of speech and/or the like. The attributes of available live agents may be compared to the preferred VA attributes for the user stored in the user profile, and a live agent may be selected with attributes that match best the preferred VA attributes for the user stored in the user profile. For example, if the user prefers VA with a female voice with New England dialect, data analysis module 130 may find a live agent that best matches the user preferred attributes.

In some embodiments, the user may interact with interaction system 105 to modify the configured VA. For example, the user may be prompted to alter the VA gender, age, dialect, language, the rate of speech, the cadence of speech, and/or the like. In some embodiments, data analysis module 130 may evaluate user satisfaction and may indicate that the user is not satisfied with a VA.

Figure 10:
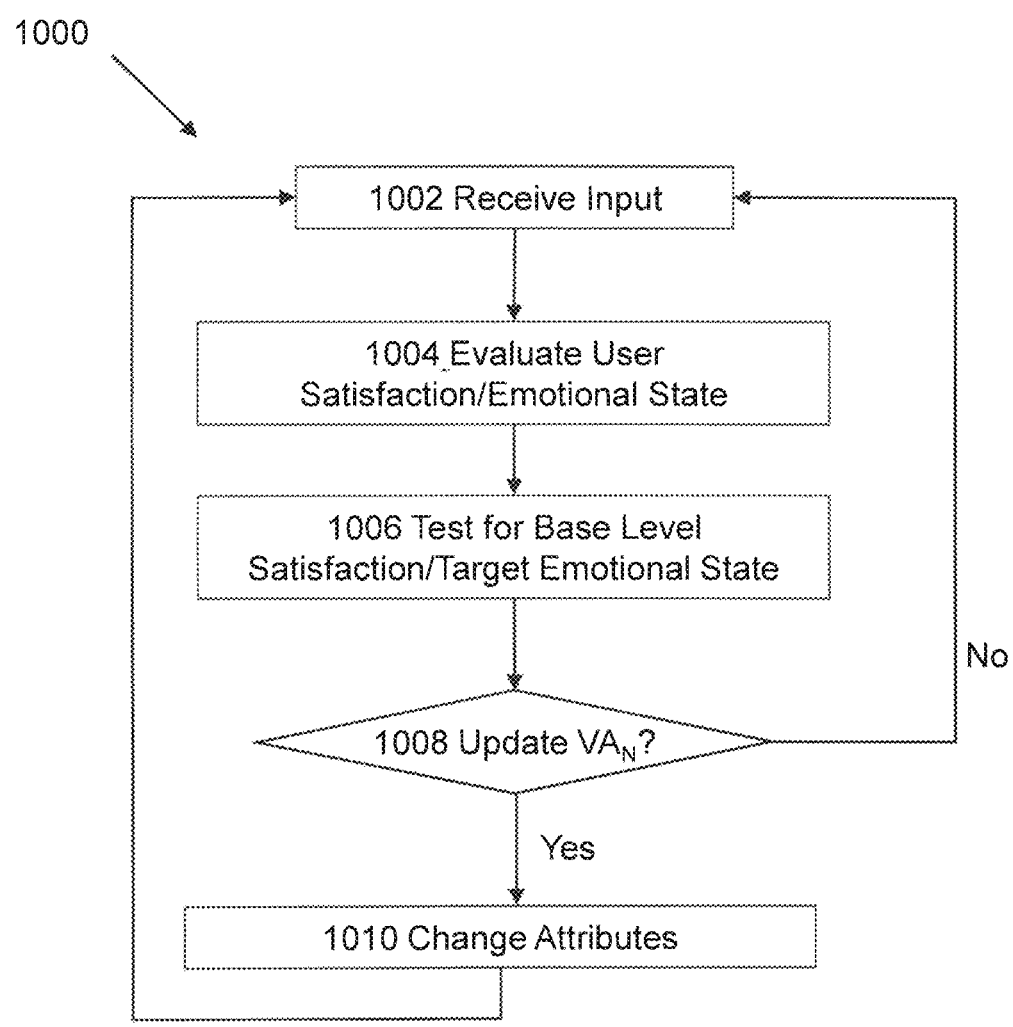
FIG. 10 is a flowchart of an illustrative process of configuring a virtual assistant based on user satisfaction.

FIG. 10 is a flowchart of an illustrative process 1000 for updating a VA for a user in communication with system 105 based on the level of user satisfaction or emotional state. The level of user satisfaction or emotional state may be inferred from language of the user speech, emotional content of the user speech, or other factors, such as how quickly the user receives the information that he/she is requesting. In an example embodiment, data analysis module 130 may be configured to evaluate user satisfaction or emotional state throughout the user communication with interaction system 105 and to store the timetable of user satisfaction or emotional state in the user profile. In some embodiments, data analysis module 130 may evaluate a base level satisfaction or a target emotional state for a user depending on user characteristics. For example, some users may, in general, be satisfied when communicating with VAs of the system 105, and some users may generally be irritated. In various embodiments, data analysis module 130 may store the base level satisfaction and/or target emotional state in the user profile classified by type of request from the user.

The base level of satisfaction or target emotional state may be different for different types of user requests. For example, the base level satisfaction may be high for a user seeking a current balance for the checking account but may be low for a user reporting a loss or theft of a credit card. In some embodiments, the target emotional state may be {"happy", "surprised"} for the user receiving a gift and {"sad", "scared"} for the user inquiring about his/her credit card debt. In various embodiments, the base level of satisfaction may be one attribute of the target emotional state and interaction system 105 may be configured to modify VA attributes to either bring the user into a target emotional state or to help the user reach base level satisfaction.

In step 1002 of process 1000, interaction system 105 may be configured to receive an input from a user via data handling module 110. For example, the user may communicate with interaction system 105 using audio signals such as real-time streaming audio data, video data, or text data. In step 1004, interaction system 105 may evaluate the user satisfaction level or emotional state using data analysis module 130, and in step 1006, determine whether the user satisfaction level is exceeding the base level satisfaction (or approaches target emotional state). The decision to update the VA may be implemented in step 1008, and may be based on information obtained from step 1006. Step 1008 may also be based on other available information, such as, for example, the duration of the conversation with the user, the history of previous conversations and/or the like. If an update of the VA is required (step 1008, Yes), process 1000 may proceed to step 1010 and update the VA. Alternatively, if updates are not required (step 1008, No) process 1000 may proceed to step 1002 of receiving additional input from the user.

In some embodiments, interaction system 105 may be configured to receive a real-time streaming audio or video data associated with user communication and select a first and a second time interval for determining user characteristics. For example, interaction system 105, using data analysis module 130, may determine first user characteristics based on the first time interval and second user characteristics based on the second time interval. For instance, during the first time interval, data analysis module 130 may determine a first rate of speech of the user, and during the second time interval data analysis module 130 may determine a second rate of speech of the user. It should be noted, that the rate-of-speech characteristic is only illustrative and other characteristics, such as volume of the sound, pitch of the speech, inflection of the speech, cadence of the speech, etc. may be used. In some embodiments, data analysis module 130 may be configured to determine a change between the first and the second user characteristics and modify the virtual assistant attributes, based on the determined change. For example, if data analysis module 130 detects that the rate of speech of the user has decreased during the second time interval data analysis module 130 may instruct virtual assistant module 140 to reduce the rate of speech of the VA interacting with the user. In various embodiments, data analysis module 130 may be configured to change other attributes of the VA, such as vocabulary of the VA, type of answers provided by the VA, or various aspects of the VA's speech.

In some embodiments, data analysis module 130 may select a first and a second time interval to partition real-time streaming audio data based on pauses within the streaming audio data. In some embodiments, the first time interval may correspond to one instance of request from the user or user reply, and the second time interval may correspond to another instance of request from the user or user reply. In an alternative example embodiment, the first and the second time interval may be selected by data analysis module 130 based on a corresponding rate of spoken words identified in the real-time streaming audio or video data received from the user.

The VA updates may be implemented in data analysis module 130 by first analyzing the history of various VA updates associated with the user communicating with interaction system 105, or VA updates associated with other users having similar user characteristics to the user in communication with interaction system 105, for the same type of request. For example, data analysis module 130 may indicate that certain changes in VA attributes (based on historical trends for the user and the type of request) may lead to improved satisfaction.

Figure 11:
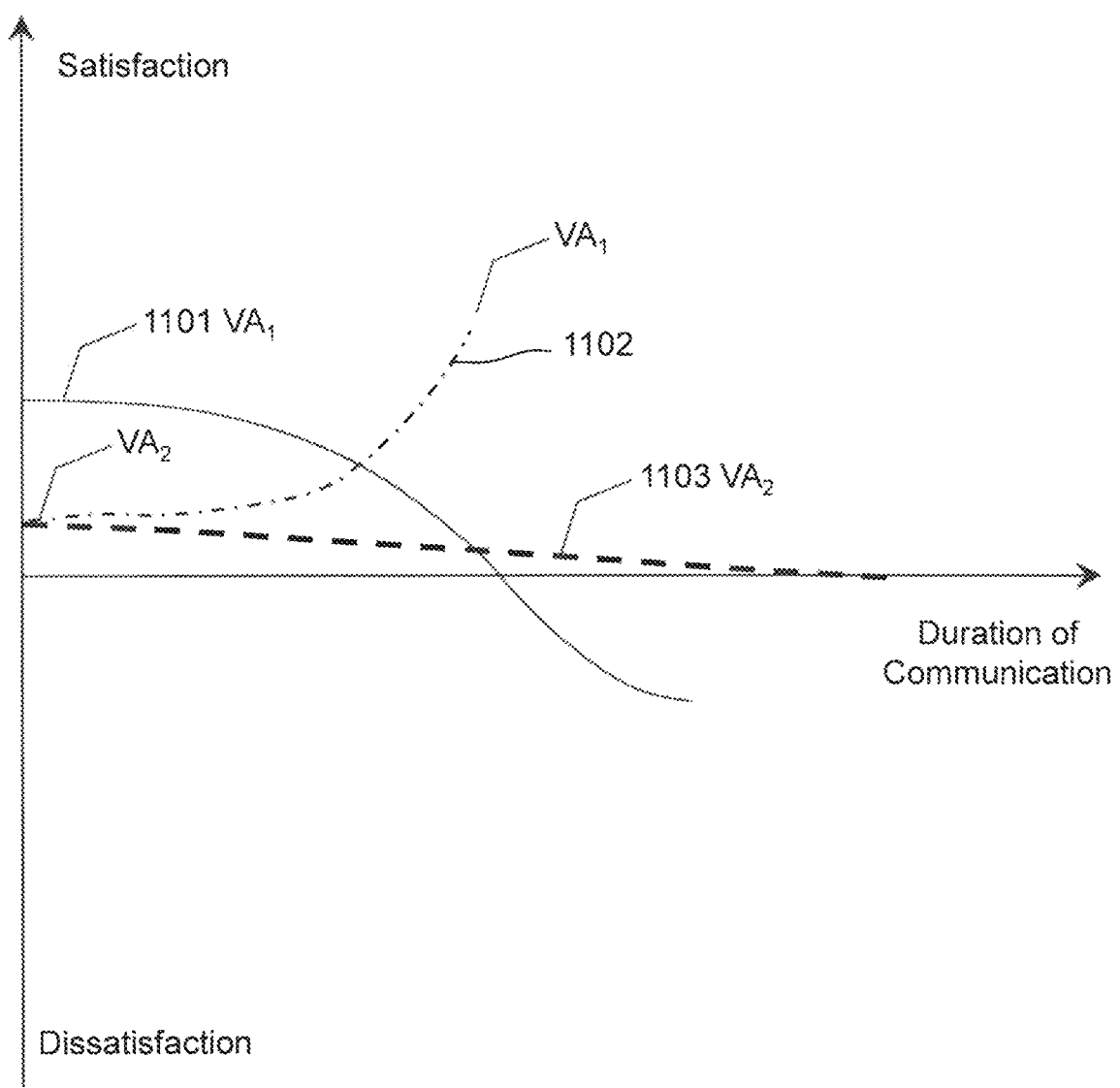
FIG. 11 shows an illustrative graph of user satisfaction during communication with the virtual assistant.

In some embodiments, the process of changing the VA attributes may contribute to user satisfaction. For example, FIG. 11 graphically displays user satisfaction as a function of the duration time of the user communicating with interaction system 105. For a user communicating with a $VA_1$ (curve 1101), satisfaction may be decreasing during the conversation. Similarly, for the user interacting with $VA_2$ (curve 1103) the satisfaction may be steadily decreasing. However, when interaction system 105 is configured to present the user with virtual assistant $VA_2$ during the initial stage of interaction and change the virtual assistant to $VA_1$ during the final stage of the interaction, the user experience may be significantly improved, as shown for example by curve 1102. In various embodiments, the change in how interaction system 105 interacts with the user may result in improved user experience.

In some embodiments, the change between attributes of $VA_2$ and $VA_1$ may be gradual, and in some embodiments, the change may be substantial and discrete. For example, the substantial and discrete change may relate to VA change in gender attributes, vocabulary, the rate of speech, and/or the like. In some embodiments, the change in VA attributes may be associated with different requests from the user. For example, the user may request to open a checking account and to check the balance in the savings account. The first request of opening the checking account may be handled by a first VA and the second request of checking the balance in the savings account may be handled by a second VA. Another example may be related to user communications related to purchasing goods or services. For example, the user may purchase power tools and cosmetics at the department store. The first VA may be configured to answer questions related to power tools and the second VA may be configured to answer questions related to cosmetics. For example, the first VA may have a voice of a thirty-five-year-old male, and the second VA may have a voice of a twenty-year-old female.

Figure 12:
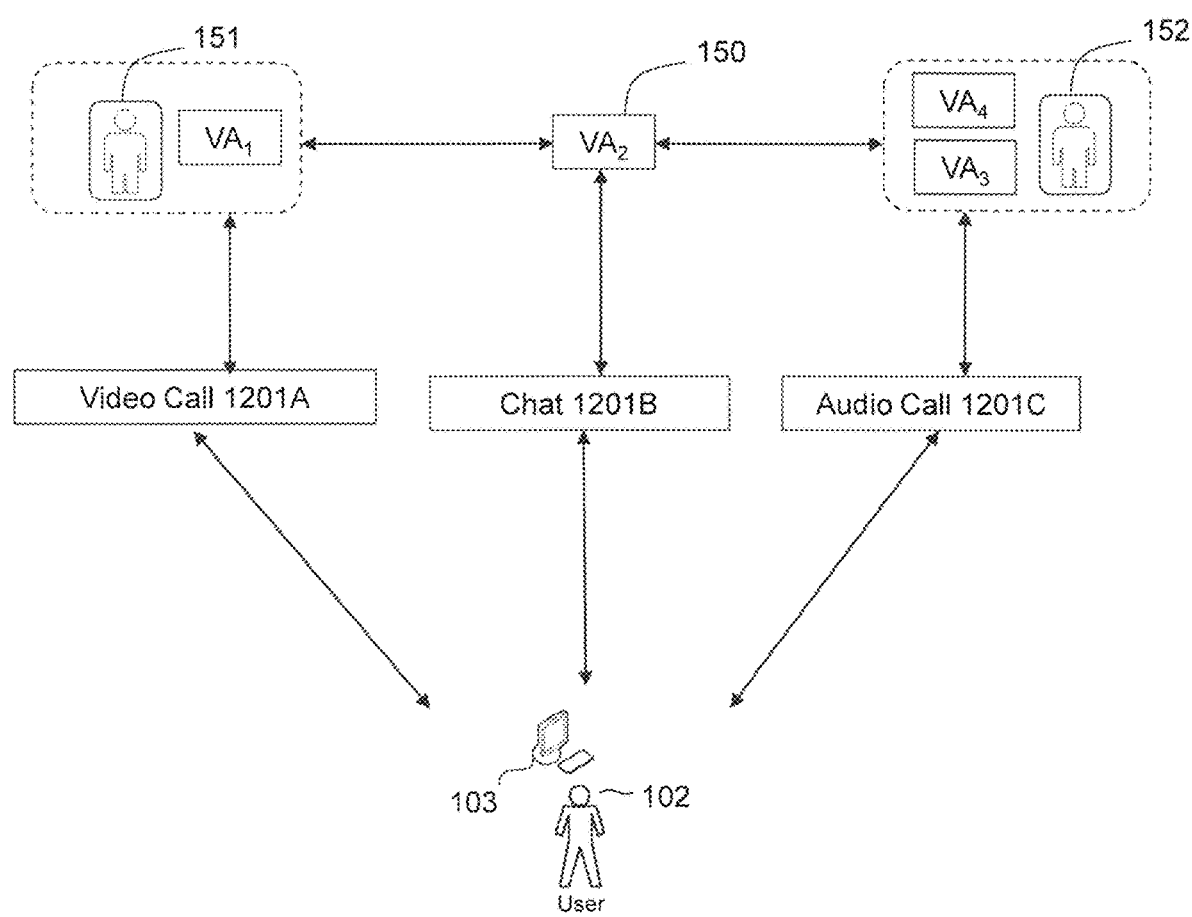
FIG. 12 is a block diagram of an illustrative system for a user interacting with the virtual assistant using multiple channels.

In various embodiments, the user may interact with interaction system 105 using several devices or channels of communication. For example, FIG. 12 shows a block diagram of a user interacting with interaction system 105 using various channels of communication such as video call 1201A, chat 1201B and audio call 1201C. Chat 1201B may include exchanging the graphics and text data with interaction system 105. In various embodiments, interaction system 105 may be configured to provide different assistance for different communication channels. In an illustrative embodiment, interaction system 105 may be configured to provide both a live agent 151 and a first VA ($VA_1$) for video call 1201A, a second VA ($VA_2$) for chat 1201B and a live agent 152 and a $VA_3$ and $VA_4$ for the audio call. Interaction system 105 may coordinate different responses between the $VA_1$-$VA_4$ as well as responses from the live agents 151 and 152 during the user communication.

In various embodiments, multiple users may interact with interaction system 105 via audio and/or video conference, and the system may be configured to respond to the user participating in the video conference via a live agent or a VA having attributes that are preferred for that user. In various embodiments, multiple users, live agents, and VAs may participate in the audio and video conference. In some embodiments, VA attributes may be selected depending on the topic assigned for discussion for a given VA. For example, in a video or audio conference regarding middle school education curriculum, the first VA may have a female voice and discuss the math curriculum, and the second VA may have a male voice and discuss music curriculum. In some embodiments, a live agent (for example a principle) for the middle school may exercise control over the VAs such as control over their topic of presentation as well as VAs attributes. In addition, the live agent may also participate in the video or audio conference.

In various embodiments, interaction system 105 may be managed by a human administrator. For example, the administrator may have an interface to modify data in the user profile and may have authority to specify the VA for any user communicating with interaction system 105. In some embodiments, interaction system 105 may provide an interface for the administrator to modify parameters of data handling module 110, user profile module 120, and/or data analysis module 130. For example, the administrator may select parameters of the speech-to-text engine for the data handling module or modify the computer models that are used in comprehension of the audio signals received from the user.

In some embodiments, interaction system 105 may provide a user interface for the user to modify the user profile. For example, the user may select a set of VAs for communication with interaction system 105. In some embodiments, for each type of request, the user may customize a VA. In some embodiments, the user may change at least some of VA's attributes during the communication with interaction system 105 using user interface.

In an example embodiment, the interface for the administrator and/or the user may be implemented as a software application for a smartphone, smartwatch, tablet or any other mobile device, and in another example embodiment, the user interface may be implemented as a voice-operated menu. In an alternative example embodiment, the user interface may be implemented as a standalone software application for desktop or laptop computer, and in another embodiment, the interface may be implemented as an application for a web browser.

In various embodiments, the VAs may participate in a video call and in some cases may include avatars. For example, the avatars may represent human-like models of people. For example, the avatars may have realistic facial expressions and body movements and have realistic reactions to user audio, video, text, or graphics data related to the communication with interaction system 105. The avatars may be attentive to user gestures and may respond to the user gestures in a human-like fashion. For example, the avatars may make eye contact or smile.

In various embodiments, during video communication, the system 105 may be configured to recognize human facial expressions and human gestures to evaluate user satisfaction while communicating with interaction system 105. In various embodiments, the human facial expressions and any other data related to video interaction may be added to the user profile and stored in database 170.

In some embodiments, during video communication, interaction system 105 may also observe the background of the user and, based on the background information, configure a VA and appropriate VA responses. For example, if the user is communicating with interaction system 105 while located in a bar and interaction system 105 records background noise, interaction system 105 may configure the VA to speak in short loud sentences in a high pitch. Alternatively, if the user is communicating from the library, interaction system 105 may configure the VA to speak in a whispering manner.

Figure 13:
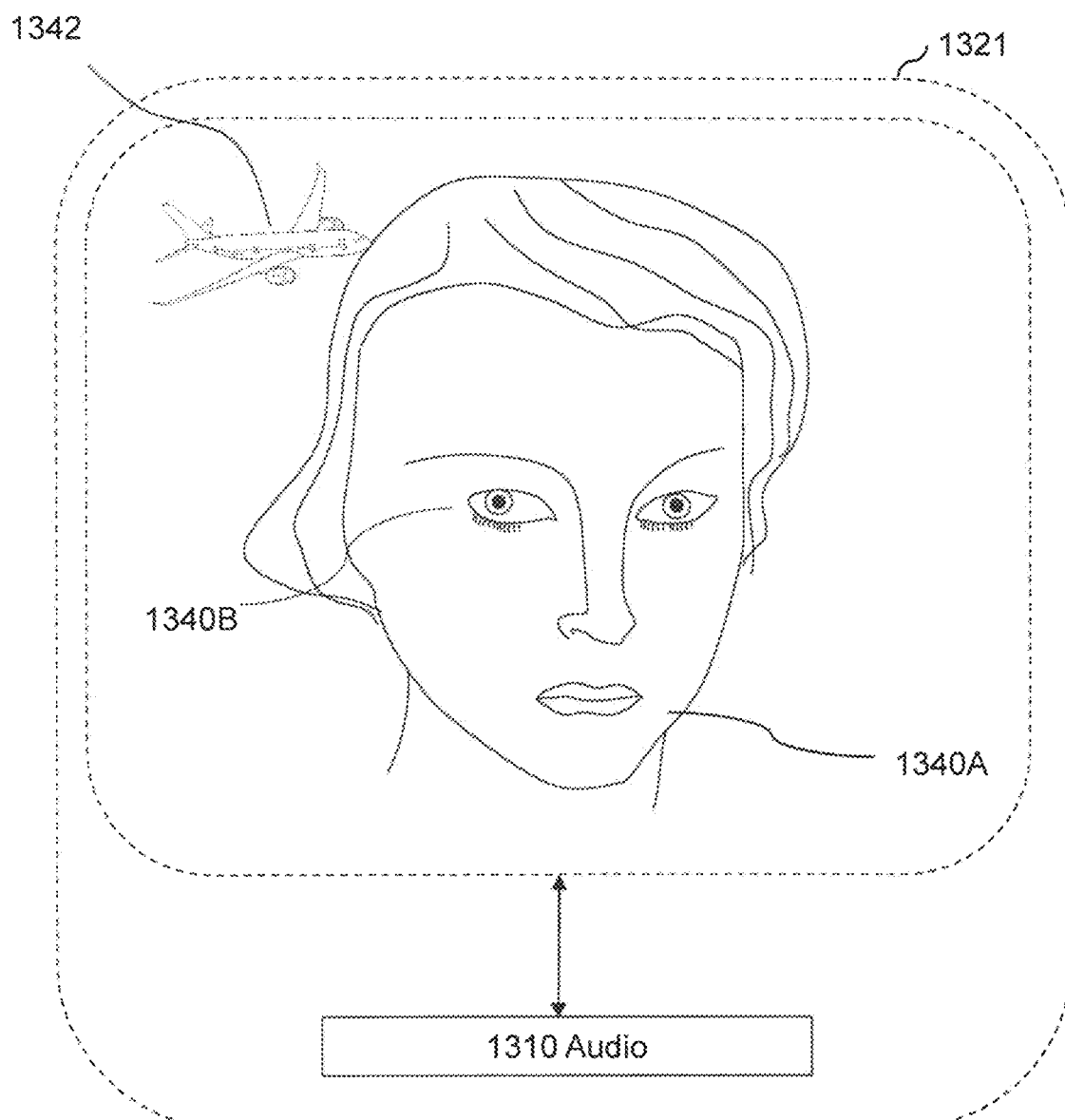
FIG. 13 shows an illustrative system for configuring a virtual assistant based on user facial expressions and background data during a video call.

FIG. 13 shows elements of a video call 1321 that can be analyzed by data analysis module 130. For example, data analysis module 130 may analyze expressions 1340A and 1340B. Expressions 1340A and 1340B may be associated with different parts of the face as shown in FIG. 13. Data analysis module 130 may analyze video and audio background of the video call. For example, data analysis module 130 may detect that the user is in an airport by analyzing the background (such as, for example, detecting an airplane 1342 in the background of the user). Data analysis module 130 may correlate the audio streaming data associated with user request 1310, the video data associated with the user video, and the visual response of the user to the answers provided by the VA of interaction system 105. The correlational data may be used to identify the satisfaction of the user during communication with interaction system 105.

In various embodiments, a user might require an assistance of interaction system 105 during an interaction with a software application or a Webpage. For example, a user may require assistance for finding a Webpage in a Web portal, for filling forms found in a Webpage or by following steps when using software application. Interaction system 105 may be configured to detect the activity of a user when the user is using a software application or a Webpage and assist the user via VA. The VA may be configured to identify visual objects within a software application or a Webpage, describe the visual objects to the user and, in some cases, have control over input devices for the software application or a Webpage (e.g., the VA may control the mouse and/or the keyboard). In some instances, interaction system 105 may be configured to select attributes of the software application or a Webpage that are preferred by the user. For example, interaction system 105 may be configured to change the language of the software application or a Webpage and present the user with a VA that interacts with the user via the user's preferred language. In some embodiments, the VA may interact with the user through text using chat window, and in some embodiments, the VA may interact with the user via synthesized speech.

In some embodiments, when the user is communicating from a place where he/she can only communicate for a short period of time (e.g., before boarding on the airplane), interaction system 105 may configure a VA that may answer user questions prior to user boarding the plane. For example, interaction system 105 may configure a VA that answers only important questions briefly. In some instances, the user may indicate the amount of time he/she may have for the communication with interaction system 105, and interaction system 105 may attempt to answer the user questions within the time frame indicated by the user.

While the present disclosure generally describes user interaction with interaction system 105 using audio, video, graphics, and text data, other communication data may include vital signals of the user such as pulse, blood pressure, blood sugar, breathing rate, body temperature, body motion and/or the like. The vital signals may be transmitted to interaction system 105 using wearable devices, such as, for example, a Fitbit or Apple watch. Interaction system 105 may configure a VA or a live agent (including the appropriate response of the VA) considering the vital signals received from the user. For example, interaction system 105 may receive an increased heart rate signal from the user, indicating a high stress level of the user, and select the appropriate response (e.g., transferring a user to a live agent). In some embodiments, interaction system 105 may configure a VA or live agent based several factors that may include: the vital signals received from the user, the location of the user; background visual and audio data obtained from the user communicating with interaction system 105, as well as extraneous data relating to the user and the location of the user. For example, if interaction system 105 has determined that the user is located in a flooded region, and the user body temperature is low, interaction system 105 may transfer the user to a live agent.

In various embodiments, interaction system 105 may include a processor and a memory device storing instructions causing the processor to receive a request from a user for a response and identify characteristics of the user within the user request, with at least some the characteristics being related to pre-compiled values. In various embodiments, the memory device and the processor may be part of data analysis module 130. In an illustrative embodiment, user characteristics may include preferred language, and pre-compiled values may include other languages that the user may speak.

Data analysis module 130 may be configured to identify the features of the user request. For example, the features may include a high volume of the speech of the user, high rate of the speech, and presence of key words/phrases that help identify the type of the request. For example, the key word/phrases may be "urgent", "emergency", "theft of the card", "flat tire", "account balance" and/or the like. Data analysis module 130 may classify the request by a type based on the request features. For example, data analysis module 130 may identify the request as type "urgent", "important", "complex", "request that may require a lot of explanation", "request that may require a lot of information from the user", and/or the like. It should be noted that various other request types may be identified by data analysis module 130. In various embodiments, based on the request type, data analysis module 130 instructs virtual assistant module 140 to provide a VA having attributes configured for the request type. Additionally, the provided VA may have attributes configured to take into account user characteristics identified within the user request.

In various embodiments, data analysis module 130 may determine a type of the request and identify profile features for the user. Data analysis module 130 may select the first set of attributes for the virtual assistant corresponding to the request type and select a second set of attributes for the virtual assistant corresponding to the user profile features. For example, for request type "urgent" data analysis module 130 may select attributes of the VA that include concise language and clear pointed questions. For the user profile describing the user as a female from Rhode Island, data analysis module 130 may select a female voice with Rhode Island dialect. Data analysis module 130 may additionally modify the first and second set of attributes of the virtual assistant based on the user characteristics, such as user rate of speech, pitch, a cadence of speech and/or the like.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A system for providing a virtual assistant, comprising:
at least one memory device storing instructions; and
at least one processor configured to execute the instructions to perform operations comprising:
receiving a request from a user for a response;
identifying characteristics of the user based on the user request;
determining a type of the user request;
based on the determined type of the user request and the identified user characteristics, configuring a virtual assistant to interact with the user through at least one of synthesized speech or visual signals;
providing the virtual assistant to interact with the user;
selecting a first and a second-time interval;
associated with the user request, receiving first real-time streaming data for a duration of the first time interval;
associated with the user request, receiving second real-time streaming data for a duration of the second time interval;
determining first user characteristics associated with first real-time streaming data; determining second user characteristics associated with the second real-time streaming data;
determining a change between the first and second user characteristics; and
modifying attributes of the selected virtual assistant, based on the determined change.

2. The system of claim 1, wherein configuring the virtual assistant comprises selecting a virtual assistant from among a plurality of pre-stored virtual assistants having a plurality of attributes.

3. The system of claim 2, wherein the attributes comprise synthesized speech attributes.

4. The system of claim 3, wherein the operations further comprise:
asking the user a question;
receiving spoken words associated with the user;
based on the spoken words, determining a proficiency level of a speech of the user;
based on at least one of a tone or a cadence of the spoken words, determining a gender and an age of the user; and
for the selected virtual assistant, configuring a proficiency level, age, and gender of the synthesized speech, based on the determined user proficiency level, gender, and age.

5. The system of claim 3, wherein the synthesized speech attributes comprise at least one of an accent, a loudness range, a speed, a pitch range, a choice of words, a gender, or a sentiment.

6. The system of claim 1, wherein:
the user request comprises a verbal communication from the user; and
the identified user characteristics comprise speech characteristics of the user.

7. The system of claim 1, wherein the operations further comprise:
creating a user profile based on at least one of the identified user characteristics;
modifying the user profile based on the at least one identified user characteristic; and
modifying attributes of the selected virtual assistant, based on the modified user profile.

8. The system of claim 1, wherein the operations further comprise:
  receiving real-time streaming data associated with the user request;
  determining the user characteristics based on the real-time streaming data; and
  modifying attributes of the selected virtual assistant, based on the determined user characteristics.

9. The system of claim 1, wherein the operations further comprise:
  receiving real-time streaming data associated with the user request;
  identifying a rate of spoken words in the received real-time streaming data; and
  selecting the first and second time intervals based on the identified rate of spoken words.

10. A system for providing a virtual assistant comprising:
  at least one memory device storing instructions; and
  at least one processor configured to execute the instructions to perform operations comprising:
    receiving a request from a user for a response;
    identifying characteristics of the user based on the user request and pre-compiled values;
    identifying characteristics of the request;
    determining a type of the request based on the request characteristics;
    configuring a virtual assistant having attributes based on the request type and the user characteristics;
    selecting a first and a second-time interval;
    associated with the user request, receiving first real-time streaming data for a duration of the first time interval;
    associated with the user request, receiving second real-time streaming data for a duration of the second time interval;
    determining first user characteristics associated with first real-time streaming data; determining second user characteristics associated with the second real-time streaming data;
    determining a change between the first and second user characteristics; and
    modifying attributes of the selected virtual assistant, based on the determined change.

11. The system of claim 10, wherein the request type comprises at least one of an urgency of the response, an importance of the response, or a complexity of the response.

12. The system of claim 10, wherein:
  the user request comprises speech; and
  identifying user characteristics comprises identifying an emotional state of the user based on the speech.

13. The system of claim 10, wherein the virtual assistant attributes comprise at least one of synthesized speech or visual signals.

14. The system of claim 13, wherein:
  the operations further comprise determining, from the request, a proficiency level of user speech; and
  the virtual assistant attributes comprise synthesized speech at a proficiency level based on the determined user speech proficiency level.

15. The system of claim 13, wherein the operations further comprise:
  collecting, for a duration of a time interval, real-time streaming data associated with the user request;
  determining an emotional state of the user based on the streaming data;
  comparing the determined emotional state of the user with a target emotional state; and
  modifying the virtual assistant attributes, based on the comparison of the determined emotional state of the user and the target emotional state.

16. The system of claim 15, wherein modifying the virtual assistant attributes comprises modifying the synthesized speech.

17. The system of claim 15, wherein modifying the virtual assistant attributes comprises modifying an emotional content of the synthesized speech based on the identified user characteristics.

18. The system of claim 10, wherein the operations further comprise:
  prompting the user for a selection of attributes of the virtual assistant; and
  modifying the attributes of the virtual assistant based on the user selection.

19. A method for selecting a virtual assistant for a user having a profile, comprising:
  receiving a request from the user for a response;
  determining a type of the request;
  identifying profile features for the user;
  selecting a first set of attributes for the virtual assistant corresponding to the request type;
  selecting a second set of attributes for the virtual assistant corresponding to the identified user profile features;
  identifying user characteristics based on the request;
  modifying the first and second sets of the virtual assistant attributes based on the identified user characteristics;
  selecting a first and a second-time interval;
  associated with the user request, receiving first real-time streaming data for a duration of the first time interval;
  associated with the user request, receiving second real-time streaming data for a duration of the second time interval;
  determining first user characteristics associated with first real-time streaming data; determining second user characteristics associated with the second real-time streaming data;
  determining a change between the first and second user characteristics; and
  modifying attributes of the selected virtual assistant, based on the determined change.

* * * * *